United States Patent
Ooi et al.

(10) Patent No.: US 10,228,500 B2
(45) Date of Patent: Mar. 12, 2019

(54) OPTICAL FILTER AND IMAGING DEVICE

(71) Applicant: AGC Inc., Chiyoda-ku (JP)

(72) Inventors: Yoshiharu Ooi, Chiyoda-ku (JP); Kazuhiko Shiono, Koriyama (JP); Asana Yoshioka, Chiyoda-ku (JP); Shoko Suzuki, Koriyama (JP); Hiroki Hotaka, Koriyama (JP)

(73) Assignee: AGC Inc., Chiyoda-ku (JP)

( * ) Notice: Subject to any disclaimer, the term of this patent is extended or adjusted under 35 U.S.C. 154(b) by 77 days.

(21) Appl. No.: 15/466,118

(22) Filed: Mar. 22, 2017

(65) Prior Publication Data

US 2017/0192144 A1 Jul. 6, 2017

Related U.S. Application Data

(63) Continuation of application No. PCT/JP2016/062658, filed on Apr. 21, 2016.

(30) Foreign Application Priority Data

Apr. 23, 2015 (JP) .................................. 2015-088818

(51) Int. Cl.
*F21V 9/04* (2018.01)
*F21V 9/06* (2018.01)
(Continued)

(52) U.S. Cl.
CPC .............. *G02B 5/281* (2013.01); *G02B 5/223* (2013.01)

(58) Field of Classification Search
CPC . G02B 5/22; G02B 5/28; G02B 5/201; G02B 5/208; G02B 5/223; G02B 5/226;
(Continued)

(56) References Cited

U.S. PATENT DOCUMENTS

| 7,192,897 B2 | 3/2007 | Yamane et al. |
| 8,159,596 B2 | 4/2012 | Yamano |
| (Continued) | | |

FOREIGN PATENT DOCUMENTS

| CN | 1979230 | 6/2007 |
| CN | 104755969 | 7/2015 |
| (Continued) | | |

OTHER PUBLICATIONS

International Search Report dated Jul. 19, 2016 in PCT/JP2016/062658, filed on Apr. 21, 2016 ( with English translation).

*Primary Examiner* — Mustak Choudhury
(74) *Attorney, Agent, or Firm* — Oblon, McClelland, Maier & Neustadt, L.L.P.

(57) ABSTRACT

An optical filter includes: an absorption layer containing a first near-infrared absorbent having a maximum absorption in a wavelength of 660 to 785 nm, and satisfying (i-1) in 620 to 670 nm, on a shorter wavelength side of a wavelength λ ($DA\_T_{min}$) exhibiting the maximum absorption, there is a wavelength λSh (DA_T50%) at which a transmittance becomes 50%; and a reflection layer formed of a dielectric multilayered film satisfying (ii-1) in 670 to 1200 nm, there is a near-infrared reflection band in which a transmittance with respect to light at an incident angle of 0° becomes 50% or less, and a wavelength λSh (A2_Ts50%) at which a transmittance of light of an s polarization component out of light at an incident angle of 30° becomes 50%, on a shorter wavelength side of the near-infrared reflection band, is positioned on a longer wavelength side of the wavelength λSh (DA_T50%).

25 Claims, 18 Drawing Sheets

(51) Int. Cl.
*G02B 5/08* (2006.01)
*G02B 5/20* (2006.01)
*G02B 5/28* (2006.01)
*G02B 5/22* (2006.01)

(58) Field of Classification Search
CPC ....... G02B 5/281–5/288; G02B 5/0242; G02B 5/0278; G02B 5/0833; G02B 13/008; G03B 11/00; B32B 17/10633; B32B 17/0036; B32B 17/10174; B32B 17/10788; B32B 17/10678; B32B 17/10449; B32B 17/10; H04N 5/332; H04N 5/335; H04N 5/357; H04N 5/2254; H01L 27/14621; H01L 27/14623; H01L 27/1462; H01L 27/322
USPC ............... 359/356, 359, 350, 586, 588, 885; 348/294; 252/587; 257/432
See application file for complete search history.

(56) References Cited

U.S. PATENT DOCUMENTS

| | | | |
|---|---|---|---|
| 8,693,089 | B2 | 4/2014 | Saitoh et al. |
| 2007/0127126 | A1* | 6/2007 | Terada .................. G02B 5/0833 359/586 |
| 2010/0188737 | A1 | 7/2010 | Terada |
| 2014/0063597 | A1 | 3/2014 | Shimmo et al. |
| 2014/0091419 | A1 | 4/2014 | Hasegawa et al. |
| 2014/0264202 | A1 | 9/2014 | Nagaya et al. |
| 2015/0146057 | A1 | 5/2015 | Konishi et al. |
| 2015/0285971 | A1 | 10/2015 | Nagaya et al. |
| 2015/0293283 | A1 | 10/2015 | Nara et al. |
| 2016/0231482 | A1 | 8/2016 | Hasegawa et al. |

FOREIGN PATENT DOCUMENTS

| | | |
|---|---|---|
| JP | 2006-106570 | 4/2006 |
| JP | 2006-301489 | 11/2006 |
| JP | 2007-183525 | 7/2007 |
| JP | 2008-51985 | 3/2008 |
| JP | 2008-181028 | 8/2008 |
| JP | 2011-100084 | 5/2011 |
| JP | 2011100084 A * | 5/2011 |
| JP | 2012-103340 | 5/2012 |
| JP | 2012-137645 | 7/2012 |
| JP | 2012-137646 | 7/2012 |
| JP | 2012-137647 | 7/2012 |
| JP | 2012-137648 | 7/2012 |
| JP | 2012-137649 | 7/2012 |
| JP | 2012-137650 | 7/2012 |
| JP | 2012-137651 | 7/2012 |
| JP | 2013-190553 | 9/2013 |
| JP | 2014-52482 | 3/2014 |
| JP | 2014-59550 | 4/2014 |
| JP | 2014-126642 | 7/2014 |
| JP | 2014-191346 | 10/2014 |
| JP | 2014-235258 | 12/2014 |
| KR | 10-2015-0046016 | 4/2015 |
| WO | WO 2013/054864 A1 | 4/2013 |
| WO | WO 2014/002864 A1 | 1/2014 |
| WO | WO 2014/030628 A1 | 2/2014 |
| WO | WO 2014/088063 A1 | 6/2014 |
| WO | WO 2014/163405 A1 | 10/2014 |
| WO | WO 2014/168189 A1 | 10/2014 |
| WO | WO 2014/192714 A1 | 12/2014 |
| WO | WO 2015/022892 A1 | 2/2015 |
| WO | WO 2015/034211 A1 | 3/2015 |
| WO | WO 2015/034217 A1 | 3/2015 |
| WO | WO 2015/091899 A1 | 6/2015 |
| WO | WO 2015/099060 A1 | 7/2015 |
| WO | WO 2015/122595 A1 | 8/2015 |
| WO | WO 2017/169447 A1 | 10/2017 |

* cited by examiner

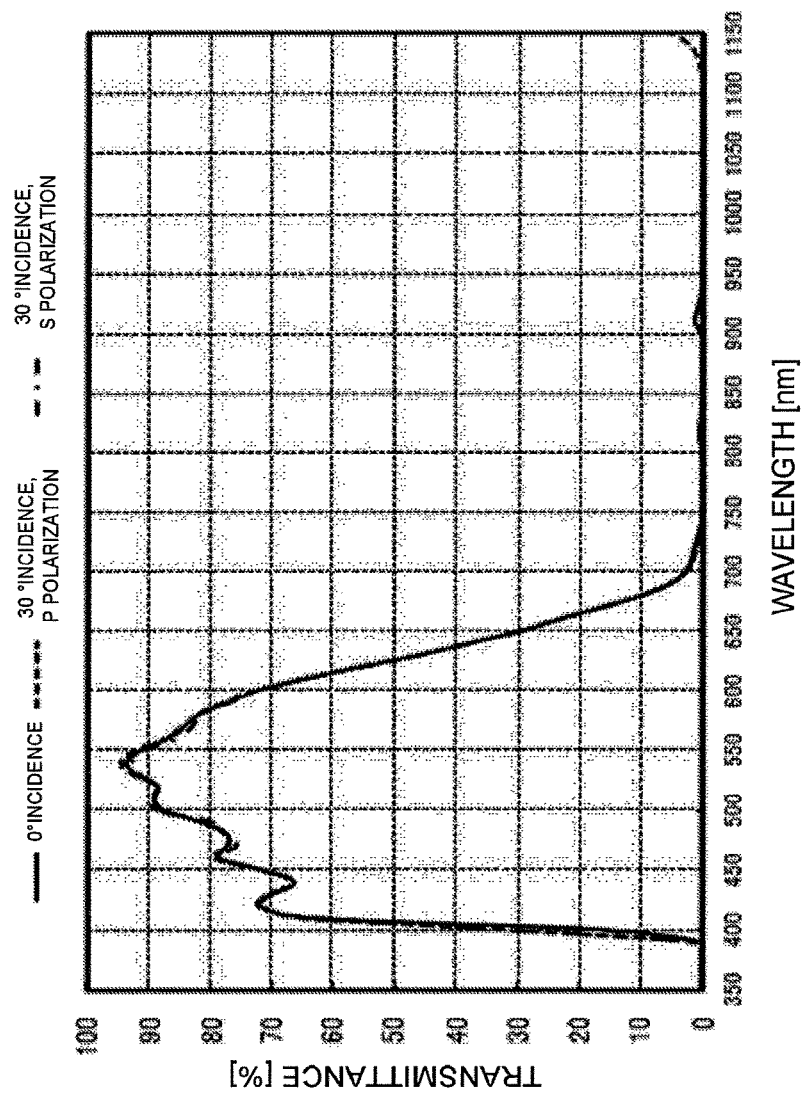

OPTICAL FILTER AND IMAGING DEVICE

CROSS-REFERENCE TO RELATED APPLICATIONS

This application is a continuation of prior International Application No. PCT/JP2016/062658, filed on Apr. 21, 2016 which is based upon and claims the benefit of priority from Japanese Patent Application No. 2015-088818, filed on Apr. 23, 2015; the entire contents of all of which are incorporated herein by reference.

FIELD

The present invention relates to an optical filter that transmits visible light and cuts-off near-infrared light, and an imaging device including the optical filter.

BACKGROUND

In an imaging device using a solid-state image sensing device such as a CCD or CMOS image sensing device, which is mounted on a digital still camera and the like, an optical filter (near-infrared cut filter) that transmits visible light and blocks near-infrared light has been used in order to favorably reproduce a color tone and obtain a clear image. In order to obtain favorable color tone reproducibility, in particular, in such an optical filter, the optical filter is required to make visible light transmit, and to exhibit a spectral transmittance curve in which ultraviolet light and near-infrared light are cut-off. As such an optical filter, there has been conventionally known an optical filter including an absorption layer (a light absorption layer) containing a near-infrared absorbing dye, and a reflection layer (a light reflection layer) formed of a dielectric multilayered film which cuts-off light in an ultraviolet wavelength region and an infrared wavelength region. In this optical filter, a spectral transmittance curve of the dielectric multilayered film itself changes (shifts) depending on an angle of incident light. For this reason, the optical filter as above tries to obtain a spectral transmittance curve excellent in color reproducibility by overlapping an absorption wavelength region of the absorption layer which contains the near-infrared absorbing dye and has a very small incident angle dependence of transmittance so as to eliminate the change, to thereby suppress the dependence of the incident angle of light (refer to Patent Reference 1 (JP-A 2013-190553), Patent Reference 2 (JP-A 2014-052482), Patent Reference 3 (International Publication WO2014/002864), and the like, for example).

However, as an angle of incident light increases, there is generated a difference in optical characteristics of the dielectric multilayered film depending also on polarization components. Specifically, spectral transmittance curves of an s polarization component and a p polarization component become different. The above-described Patent References indicate a spectral transmittance curve with respect to obliquely incident (30°, for example) light, and discloses that a difference between the spectral transmittance curve and a spectral transmittance curve with respect to vertically incident (0°) light becomes small, but, there is no concrete description regarding polarization components. Further, when attention is focused on a particular polarization component (the s polarization component or the p polarization component), in a conventional optical filter, a shift amount becomes large, and a shift in a spectral transmittance curve in oblique incidence caused by the polarization component of incident light was not sufficiently eliminated. The shift (amount) mentioned here corresponds to a change (amount) of wavelength observed at a rising or a fall of transmittance in the spectral transmittance curve, in particular.

For this reason, the conventional optical filter has a problem that the incident angle dependence caused by the polarization components is generated. In particular, if incident angle dependence of light and polarization dependence in the optical filter increase in a region, in the vicinity of 700 nm being a boundary between a visible region and a near-infrared region, in which transition from transmission to cut-off occurs, the optical filter cannot obtain high-precision color reproducibility in a solid-state image sensing device. Further, if the transmittance of the optical filter increases due to the polarization dependence in the vicinity of 1150 nm, which is the longest wavelength of sensitivity of the solid-state image sensing device, the solid-state image sensing device senses an amount of light (noise) at a wavelength which should not be sensed, under normal conditions, by the solid-state image sensing device, resulting in that the high-precision color reproducibility cannot be obtained.

SUMMARY

Therefore, the present invention has an object to provide an optical filter in which polarization dependence during oblique incidence is suppressed, an optical filter in which polarization dependence in a region, in the vicinity of 700 nm being a boundary between a visible region and a near-infrared region, in which transition from transmission to cut-off occurs is suppressed, in particular, and further, an optical filter in which increase in transmittance due to polarization dependence is suppressed in the vicinity of 1150 nm, which is the longest wavelength of sensitivity of a solid-state image sensing device, and an imaging device including the optical filter and having excellent color reproducibility of a captured image.

An optical filter according to one aspect of the present invention includes: an absorption layer containing a near-infrared absorbent having a maximum absorption in a wavelength of 660 to 785 nm, and satisfying the following requirement (i-1); and a reflection layer formed of a dielectric multilayered film satisfying the following requirement (ii-1), (i-1) in a wavelength of 620 to 670 nm, on a shorter wavelength side of a wavelength λ (DA_$T_{min}$) exhibiting the maximum absorption, there is a wavelength λSh (DA_T50%) at which a transmittance becomes 50%, and (ii-1) in a wavelength of 670 to 1200 nm, there is a near-infrared reflection band in which a transmittance with respect to light at an incident angle of 0° becomes 50% or less, and a wavelength λSh (A2_Ts50%) at which a transmittance of light of an s polarization component out of light at an incident angle of 30° becomes 50%, on a shorter wavelength side of the near-infrared reflection band, is positioned on a longer wavelength side of the wavelength λSh (DA_T50%).

Further, an optical filter according to another aspect of the present invention includes: an absorption layer containing a first near-infrared absorbent having a maximum absorption in a wavelength of 660 to 785 nm, and a second near-infrared absorbent having a maximum absorption in a wavelength of 800 to 920 nm, and satisfying the following requirement (I-1); and a reflection layer formed of a dielectric multilayered film satisfying the following requirement (II-1), (I-1) there is a wavelength λSh (DA_T50%) at which a transmittance becomes 50% in a wavelength of 620 to 670 nm, on a shorter wavelength side of a wavelength λ (DA_T$_{min}$) at which the first near-infrared absorbent exhibits the maximum absorption, there is a wavelength λLo (DB_T50%) at which a transmittance becomes 50% in a wavelength of 900 to 970 nm, on a longer wavelength side of a wavelength λ (DB_T$_{min}$) at which the second near-infrared absorbent exhibits the maximum absorption, and a relation of λSh (DA_T50%)<λ (DA_T$_{min}$)<λ (DB_T$_{min}$) <λLo (DB_T50%) is satisfied, and (II-1) in a wavelength of 670 to 1200 nm, there is a near-infrared reflection band in which a transmittance with respect to light at an incident angle of 0° becomes 50% or less, a relation among a wavelength λSh (A1_T50%) at which a transmittance becomes 50% on a shorter wavelength side in the near-infrared reflection band, the wavelength λ (DB_T$_{min}$), and the wavelength λLo (DB_T50%) is expressed as λ (DB_T$_{min}$)<λSh (A1_T50%)<λLo (DB_T50%), and a wavelength λLo (A1_Tp15%) at which a transmittance of light of a p polarization component out of light at an incident angle of 30° becomes 15%, on a longer wavelength side in the near-infrared reflection band, is a wavelength longer than a wavelength of 1150 nm.

An imaging device according to still another aspect of the present invention includes any one of the above-described optical filters.

According to the present invention, it is possible to obtain an optical filter in which polarization dependence during oblique incidence is suppressed, and an optical filter in which a change in transmittance due to polarization dependence in a region in the vicinity of 700 nm being a boundary between a visible region and a near-infrared region in which transition from transmission to cut-off occurs is suppressed, in particular, and an increase in transmittance due to polarization dependence in the vicinity of 1150 nm being the longest wavelength of sensitivity of a solid-state image sensing device is suppressed. Further, an imaging device excellent in color reproducibility using such an optical filter can be obtained.

BRIEF DESCRIPTION OF THE DRAWINGS

FIG. 15 is a graph illustrating a calculation result of spectral transmittances of an optical filter of an example 3.

DETAILED DESCRIPTION

Figure 1A:
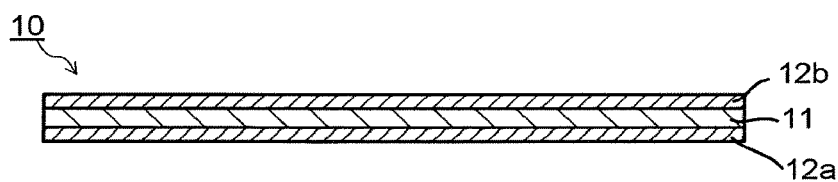
FIG. 1A is a sectional view illustrating one example of an optical filter of a first embodiment.

Hereinafter, embodiments of the present invention will be described.

First Embodiment

An optical filter of the present embodiment (which is also referred to as "present filter" in the description of the first embodiment, hereinafter) includes an absorption layer and a reflection layer, in which the reflection layer is formed of a dielectric multilayered film.

The present filter may include one layer or two layers or more of the absorption layer. If two layers or more of the absorption layer are included, each of the layers may have the same configuration or different configuration. As an example, it is possible to design such that one layer is set to a near-infrared absorption layer including a resin and a near-infrared absorbent as will be described later (which is sometimes abbreviated to "NIR absorbent", hereinafter), and the other layer is set to a near-ultraviolet absorption layer including a resin and a near-ultraviolet absorbent as will be described later (which is sometimes abbreviated to "UV absorbent", hereinafter). Further, it is also possible that the absorption layer itself functions as a substrate (resin substrate).

The present filter may include one layer or two layers or more of the reflection layer formed of the dielectric multi-layered film, in a similar manner to the absorption layer. If two layers or more of the reflection layer are included, each of the layers may have the same configuration or different configuration, and normally, the reflection layer is configured by a plurality of reflection layers having different reflection bands. An average value of optical film thicknesses of the respective films in the respective dielectric multilayered films forming these respective reflection layers, is different in accordance with the reflection bands. As an example, it is possible that one reflection layer is set to a near-infrared reflection layer which blocks light in a shorter wavelength side region in a near-infrared region (700 to 1200 nm), and the other reflection layer is set to a near-infrared and near-ultraviolet reflection layer which blocks light in both regions of a longer wavelength side region in the near-infrared region and a near-ultraviolet region.

The present filter may further include a transparent substrate. In this case, the above-described absorption layer and the above-described reflection layer may be provided on the same principal surface or on different principal surfaces of the transparent substrate. When the absorption layer and the reflection layer are provided on the same principal surface, an order of stacking them is not particularly limited.

The present filter may also include another functional layer. As another functional layer, there can be cited an anti-reflection layer suppressing a transmittance loss in a visible region, for example. In particular, if a configuration such that the absorption layer is positioned on the uppermost surface is employed, a visible light transmittance loss is generated due to reflection at an interface between the absorption layer and the air, so that it is preferable to provide the anti-reflection layer on the absorption layer. Note that in that case, the anti-reflection layer may be configured to cover not only the uppermost surface of the absorption layer but also the entire side surface of the absorption layer. By covering the entire side surface, a damp-proof effect of the absorption layer can be enhanced.

Hereinafter, configuration examples of the present filter will be described by using the drawings.

Figure 1B:
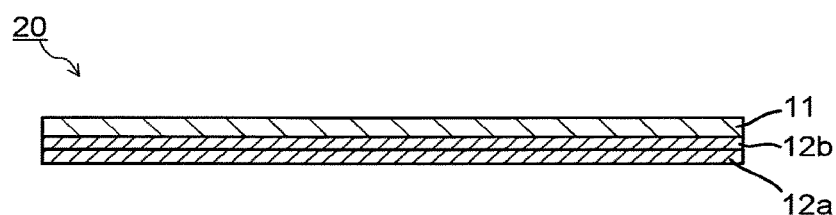
FIG. 1B is a sectional view illustrating another example of the optical filter of the first embodiment.
Figure 1C:
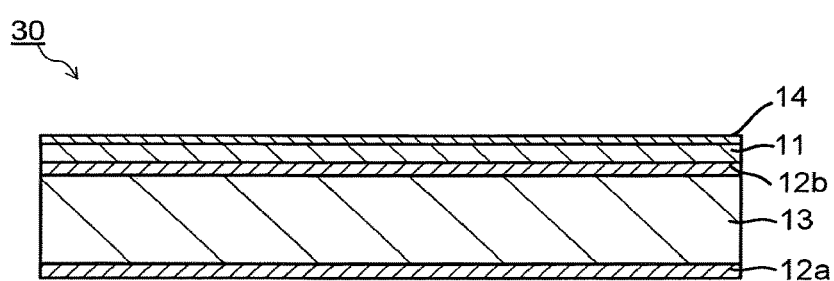
FIG. 1C is a sectional view illustrating still another example of the optical filter of the first embodiment.
Figure 1D:
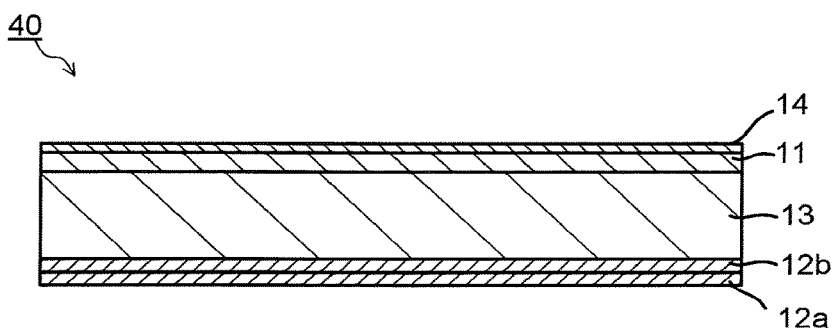
FIG. 1D is a sectional view illustrating yet another example of the optical filter of the first embodiment.

FIG. 1A illustrates a configuration example of an optical filter 10 including a first reflection layer 12a and a second reflection layer 12b provided on both principal surfaces, respectively, of an absorption layer 11. FIG. 1B illustrates a configuration example of an optical filter 20 including the first reflection layer 12a and the second reflection layer 12b provided on one principal surface of the absorption layer 11. Note that "another layer such as the first reflection layer 12a provided on one principal surface of the absorption layer 11" is not limited to the case where another layer is provided in contact with the absorption layer 11, and includes the case where a different functional layer is provided between the absorption layer 11 and another layer. The same applies to configurations to be described below. Here, the absorption layer 11 in the optical filer 10 and the optical filter 20 may also have a function as a transparent substrate in this case. FIG. 1C illustrates a configuration example of an optical filter 30 including the first reflection layer 12a and the second reflection layer 12b provided on both principal surfaces, respectively, of a transparent substrate 13, and including the absorption layer 11 and an anti-reflection layer 14 provided in this order on the second reflection layer 12b. FIG. 1D illustrates a configuration example of an optical filter 40 including the first reflection layer 12a and the second reflection layer 12b provided on one principal surface of the transparent substrate 13, and including the absorption layer 11 and the anti-reflection layer 14 provided on the other principal surface of the transparent substrate 13. Each of FIG. 1A to FIG. 1D illustrates the example in which two layers of reflection layers with different configurations are provided. As described above, the first reflection layer 12a may be the aforementioned near-infrared and near-ultraviolet reflection layer which blocks light in the longer wavelength side region in the near-infrared region and the near-ultraviolet region, and the second reflection layer 12b may be the aforementioned near-infrared reflection layer which blocks light in the shorter wavelength side region in the near-infrared region, for example. The positions of the first reflection layer 12a and the second reflection layer 12b are not particularly limited.

The present filter preferably satisfies at least one of the following requirements (1) to (3), and more preferably satisfies at least two of the following requirements (1) to (3). It is still more preferable that the present filter satisfies all of the following requirements (1) to (3).

(1) In a spectral transmittance curve at an incident angle of 0°, an average transmittance in a wavelength of 440 to 600 nm is 80% or more.

(2) In the spectral transmittance curve at the incident angle of 0°, an average transmittance in a wavelength of 350 to 400 nm is 5% or less.

(3) In the spectral transmittance curve at the incident angle of 0°, an average transmittance in a wavelength of 700 to 1150 nm is 5% or less.

In the above-described (1), the average transmittance is preferably 90% or more. Further, in the above-described (2), the average transmittance is preferably 3% or less, and more preferably 1% or less. Further, in the above-described (3), the average transmittance is preferably 3% or less, and more preferably 1% or less.

Further, the transmittance in the wavelength of 440 to 600 nm in the spectral transmittance curve at the incident angle of 0°, is preferably 60% or more, more preferably 70% or more, and furthermore preferably 80% or more. Further, the transmittance in the wavelength of 350 to 400 nm in the spectral transmittance curve at the incident angle of 0°, is preferably 10% or less, more preferably 5% or less, and furthermore preferably 1% or less. Further, the transmittance in the wavelength of 700 to 1150 nm in the spectral transmittance curve at the incident angle of 0°, is preferably 10% or less, more preferably 5% or less, and furthermore preferably 1% or less.

Next, the absorption layer, the reflection layer, the transparent substrate, and the anti-reflection layer, which form the present filter, will be described.

<Absorption Layer>

The absorption layer is a layer containing the NIR absorbent (DA) and a transparent resin (B). Typically, the absorption layer is a layer formed by uniformly dissolving or dispersing the NIR absorbent (DA) in the transparent resin (B). Note that the absorption layer may also contain an absorbent other than the NIR absorbent (DA), such as a UV absorbent (DU), for example. Further, the absorption layer may also contain a NIR absorbent (DB) which will be described in a second embodiment (hereinafter, the NIR absorbent (DA) is also referred to as "first NIR absorbent (DA)", and the NIR absorbent (DB) is also referred to as "second NIR absorbent (DB)"). The optical property of the absorption layer containing the NIR absorbent (DA) is expressed by a complex refractive index n-iκ using a refractive index n and an extinction coefficient κ, and a spectral transmittance changes by being accompanied by light absorption in accordance with a wavelength (λ) dependence of the extinction coefficient κ peculiar to the absorbent. If a thickness of the absorption layer formed of a transparent resin in which the absorbent is uniformly dispersed in a thickness direction is set to d, a spectral transmittance T (λ) of the absorption layer can be expressed as T (λ)=exp (−4πκd/λ). Here, α=4πκ/λ is an absorption coefficient, and when the transmittance is expressed by using a common logarithm, it can be expressed as T (λ)=$10^{-\beta d}$, and an absorption coefficient β corresponds to a value as a result of multiplying α by $\log_{10}(e)$=0.434. At this time, an absorbance A is expressed as $-\log_{10}\{T(\lambda)\}$=βd. The absorption coefficients α and β change depending on an absorbent concentration in the absorption layer. Specifically, the spectral transmittance of the absorption layer can be adjusted by changing the absorbent concentration in the absorption layer and the thickness d of the absorption layer.

In the present embodiment, it is desired to design the absorption layer in a manner that spectral sensitivity in a wavelength of 600 to 700 nm is approximated to a color-matching function of relative visibility corresponding to spectral sensitivity of eyes of human being, near-infrared light in 700 to 1150 nm is cut-off, and visible light in 440 to 600 nm is transmitted with high transmittance.

However, the wavelength dependence of the extinction coefficient κ is the characteristic peculiar to the absorbent, and it is generally difficult to maintain the high transmittance in the visible region and to sufficiently cut-off the light in the wide near-infrared region by the absorption. For this reason, the present filter is configured such that the spectral transmittance curve in the wavelength of 600 to 700 nm is approximated to the color-matching function, the light in the region on the shorter wavelength side in the near-infrared region of 700 nm or more is cut-off by the NIR absorbent, and the light in the region on the longer wavelength side in the near-infrared region which cannot be cut-off by the NIR absorbent is cut-off by a reflection layer to be described later.

Therefore, the absorption layer in the optical filter of the present embodiment uses the NIR absorbent (DA) having a maximum absorption wavelength λ ($DA\_T_{min}$) in a wavelength of 660 to 785 nm in an absorption spectrum of 350 to 1200 nm of a resin film produced by dissolving or dispersing the NIR absorbent in the transparent resin (B). Further, the absorption layer sets the concentration of the NIR absorbent (DA) and the thickness d so that there is a wavelength λSh (DA_T50%) at which the transmittance becomes 50% in a wavelength of 620 to 670 nm, on the shorter wavelength side of the maximum absorption wavelength λ ($DA\_T_{min}$). More preferably, the absorption layer sets the concentration of the NIR absorbent (DA) and the thickness d so that there is a wavelength λSh (DA_T15%) at which the transmittance becomes 15% in a wavelength of 640 to 700 nm, on the shorter wavelength side of the maximum absorption wavelength λ ($DA\_T_{min}$), there are a wavelength λLo (DA_T15%) at which the transmittance becomes 15% and a wavelength λLo (DA_T50%) at which the transmittance becomes 50% (Note that λLo (DA_T15%)<λLo (DA_T50%)) in a wavelength of 740 to 840 nm, on the longer wavelength side of the λ ($DA\_T_{min}$), and an average transmittance in the wavelength of 440 to 600 nm in the spectral transmittance curve at the incident angle of 0° becomes 80% or more.

Here, if the present filter is an optical filter for an imaging device in which color reproducibility of "Red" in a solid-state image sensing device with RGB color filters is considered as important, the absorption layer preferably selects the NIR absorbent (DA) so that spectral sensitivity in the wavelength of 600 to 700 nm is approximated to a color-matching function x (λ), and adjusts the concentration of the absorbent in the absorption layer and the thickness d. Further, when using an optical filter for an imaging device in which sensitivity of a solid-state image sensing device is considered as important, it is preferable to select the NIR absorbent (DA) exhibiting a steep spectral transmittance such that a higher transmittance is achieved in the wavelength of 600 to 700 nm, and light at the wavelength equal to or greater than 700 nm is absorbed.

Many NIR absorbents (DA) each formed of a single compound have a high absorption in a specific wavelength region as an absorption characteristic in a near-infrared region, have a small absorption in a visible region, and have a transmittance which increases (an absorption which decreases) on the longer wavelength side of the maximum absorption wavelength λ ($DA\_T_{min}$). For this reason, it is difficult for the NIR absorbent (DA) formed of the single compound to sufficiently absorb incident light in a wide wavelength region. However, the optical filter of the present embodiment includes a plurality of reflection layers such as the above-described first reflection layer and second reflection layer, which enables to cut-off the incident light in the wide wavelength region. Note that the absorption layer may also be configured to widen the absorption wavelength region by using a plurality of compounds with different maximum absorption wavelengths. However, if the absorption layer contains a plurality of NIR absorbents, and thus there is a residual absorption peculiar to the NIR absorbents in the visible region, the transmittance in the visible region may be lowered, so that the NIR absorbent is selected by taking these factors into consideration, and further, the concentration of the absorbent in the absorption layer and the thickness of the absorption layer are also taken into consideration.

As concrete examples of the NIR absorbent (DA) which is preferable for the optical filter of the present embodiment, there can be cited 05, 22, 57, 67, and the like in IRD series manufactured by KODAK, 5548, 5768, 6084, and the like in Epolight™ series manufactured by Epolin, Inc., 757A, 762A, 775B, 778A, 783C, and the like in NIR series manufactured by QCR Solutions Corp., ABS694, ABS691, and the like manufactured by Exciton, Inc., 1372, 3517, 4231, 4653, 5027, 5966, 6390, 6396, 7251, 8064 in SDA series, SDB3410 and the like, manufactured by H.W. Sands Corp. (all of the above are product names). Each of these has the maximum absorption wavelength λ ($DA\_T_{min}$) in the wavelength of 660 to 785 nm, and does not exhibit light absorption in the visible region of 440 to 600 nm almost at all, in the above-described absorption spectrum, and thus is preferable for the NIR absorbent (DA) in the present embodiment.

Further, a squarylium-based compound represented by the following general formula (A1) is also preferable for the NIR absorbent (DA) in the present embodiment.

[Chemical formula 1]

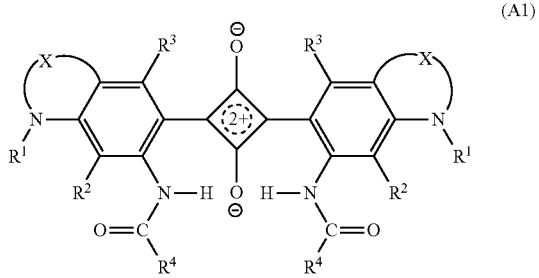

Symbols in the formula (A1) are as follows.
X is independently a bivalent organic group represented by the following formula (1) or formula (2), in which one or more hydrogen atoms may be substituted with an alkyl group or alkoxy group having 1 to 12 carbon atoms.

$$-(CH_2)_{n1}- \quad (1),$$

in the formula (1), n1 is 2 or 3.

$$-(CH_2)_{n2}-O-(CH_2)_{n3}- \quad (2),$$

in the formula (2), each of n2 and n3 is
independently an integer of 0 to 2, and n2+n3 is 1 or 2.
$R^1$ independently represents a saturated or unsaturated hydrocarbon group having 1 to 12 carbon atoms that may have a branch and may contain a saturated ring structure, a saturated cyclic hydrocarbon group having 3 to 12 carbon atoms, an aryl group having 6 to 12 carbon atoms, or an alaryl group having 7 to 13 carbon atoms.
$R^2$ and $R^3$ independently represent a hydrogen atom, a halogen atom, or an alkyl group or alkoxy group having 1 to 10 carbon atoms.
$R^4$ is independently a hydrocarbon group having 5 to 25 carbon atoms having at least one or more branches, in which one or more hydrogen atoms may be substituted with a halogen atom, a hydroxy group, a carboxy group, a sulfo group, or a cyano group and that may contain an unsaturated bond, an oxygen atom, or a saturated or unsaturated ring structure between carbon atoms.

The compound represented by the above-described general formula (A1) exhibits a steep inclination in the absorption spectrum in the vicinity of a boundary between the visible region and the near-infrared region, and exhibits high blocking performance with respect to near-infrared light. For this reason, the absorption layer exhibits excellent absorption characteristic even if a small amount of the compound is added thereto, resulting in that the reduction in thickness and size of the optical filter can be realized. Besides, the compound represented by the above-described general formula (A1) exhibits excellent heat resistance, so that a change in a spectral transmittance in a thermal process can also be suppressed.

Further, the spectral sensitivity of the solid-state image sensing device in the visible region of 400 to 450 nm is approximated to a color-matching function z (λ) of relative visibility by a "Blue" color filter formed in a "Blue" pixel in the solid-state image sensing device. Further, a part of near-ultraviolet light in 350 to 400 nm, to which eyes of human being do not have sensitivity, is also transmitted through the "Blue" color filter to be detected by the solid-state image sensing device, which sometimes hinders the high-precision color reproducibility. Therefore, the absorption layer preferably contains a UV absorbent (DU) having a maximum absorption wavelength λ ($DU\_T_{min}$) in a wavelength of 370 to 405 nm in the aforementioned absorption spectrum, in order to cut-off the near-ultraviolet light in 350 to 400 nm, and to obtain high transmittance in the visible region of 420 nm or more. Further, the absorption layer preferably sets a kind of the UV absorbent (DU), a concentration of the UV absorbent (DU) (in the absorption layer), and the thickness d, so that it has a wavelength λLo ($DU\_T50\%$) at which the transmittance becomes 50% in a wavelength of 400 to 420 nm, on the longer wavelength side of the above-described maximum absorption wavelength λ ($DU\_T_{min}$), and in the spectral transmittance curve when the incident angle is 0°, namely, in the spectral transmittance curve of light which is vertically incident on a principal surface of the absorption layer containing only the UV absorbent (DU), an average transmittance in a wavelength of 440 to 620 nm becomes 90% or more, preferably 95% or more.

Note that the absorption layer containing the UV absorbent (DU) preferably has a narrower interval between a wavelength with minimum transmittance and a wavelength with maximum transmittance, namely, a steeper change in the transmittance, in a wavelength of 370 to 440 nm, since the loss of visible light is further reduced. However, in order to obtain such a steep change, there is a need to increase the concentration of the UV absorbent (DU), and in that case, if there is a residual absorption peculiar to the UV absorbent (DU) in the visible region, the transmittance of visible light sometimes lowers. Therefore, when such a UV absorbent is used, the absorption layer preferably sets the kind of the UV absorbent (DU), the concentration of the UV absorbent (DU) (in the absorption layer), and the thickness d, so that the average transmittance in the wavelength of 440 to 620 nm falls within the above-described range.

As concrete examples of the UV absorbent (DU) which is preferable for the optical filter in the present embodiment, there can be cited SDA3382 and MSA3144 manufactured by H.W. Sands Corp., UV386A and UV386B, manufactured by QCR Solutions Corp., TINUVIN 479 manufactured by Chiba (all of the above are product names), a merocyanine-based dye, a benzotriazole-based ultraviolet absorbent, a benzophenone-based ultraviolet absorbent, a salicylate-based ultraviolet absorbent, a cyanoacrylate-based ultraviolet absorbent, a triazine-based ultraviolet absorbent, an okizamrido-based ultraviolet absorbent, a nickel complex salt-based ultraviolet absorbent, an inorganic ultraviolet absorbent, and the like. Each of these has the maximum absorption wavelength λ ($DU\_T_{min}$) in the wavelength of 370 to 405 nm, and does not exhibit light absorption in the visible region of 440 to 700 nm almost at all, and besides, each of these can obtain a relatively steep change in transmittance in a wavelength of 390 to 420 nm, in the above-described absorption spectrum, and thus is preferable for the UV absorbent (DU) of the present filter.

When the aforementioned SDA3382, for example, is used as the UV absorbent, the maximum absorption wavelength λ ($DU\_T_{min}$) is 387 nm. Further, by adjusting the concentration of the UV absorbent, it is possible to set a wavelength λLo ($DU\_T15\%$) at which the transmittance becomes 15%, the wavelength λLo ($DU\_T50\%$) at which the transmittance becomes 50%, and a wavelength λLo ($DU\_T70\%$) at which the transmittance becomes 70%, on the longer wavelength side of the maximum absorption wavelength λ ($DU\_T_{min}$), can be set to 394 nm, 402 nm, and 407 nm, respectively.

Figure 2:
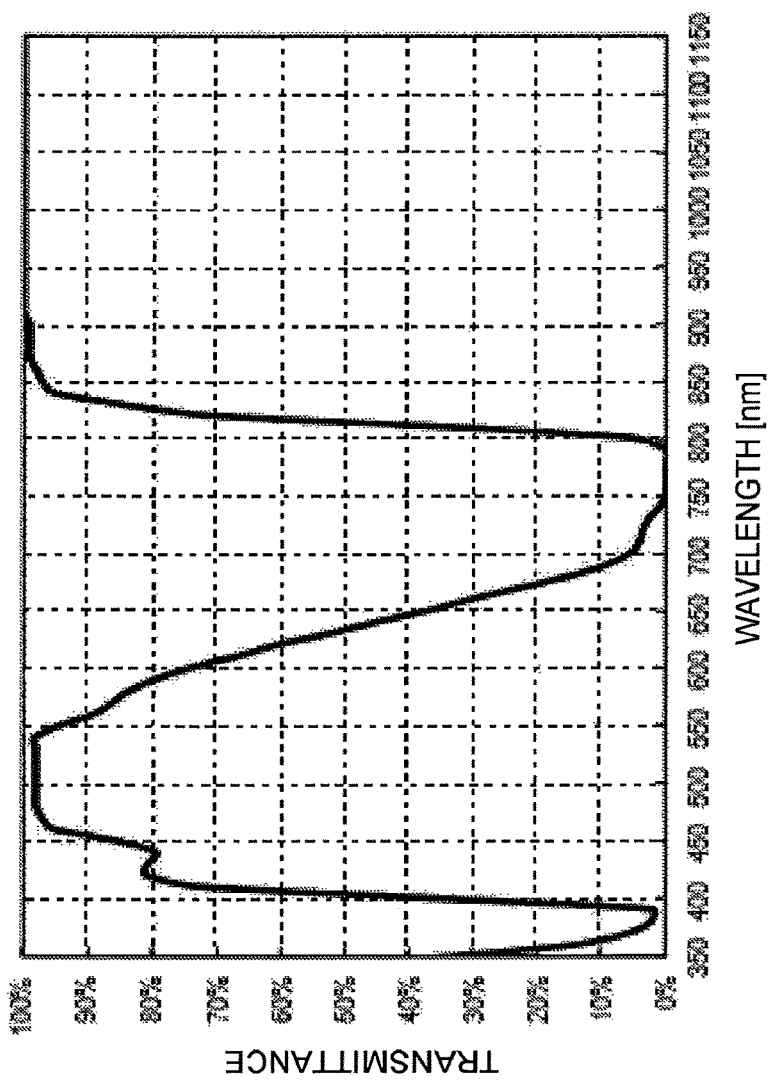
FIG. 2 is a graph illustrating a calculation result of a spectral transmittance of an absorption layer containing a UV absorbent (DU) and a first NIR absorbent (DA).

FIG. 2 illustrates one example of a spectral transmittance curve of an absorption layer in which NIR775B having the maximum absorption wavelength λ ($DA\_T_{min}$) of 775 nm is used as the NIR absorbent (DA), and the aforementioned SDA3382 is used as the UV absorbent (DU), the spectral transmittance curve being calculated by adjusting the concentrations of these in the absorption layer and the thickness d. In FIG. 2, the Fresnel reflection loss of about 4% which is generated at one interface between the absorption layer and the air is not taken into consideration, and the spectral transmittance corresponds to an internal transmittance of the absorption layer. In other words, FIG. 2 illustrates a spectral transmittance curve in a case where a predetermined anti-reflection layer is provided on the interface of the absorption layer.

As illustrated in FIG. 2, the exemplified absorption layer exhibits spectral transmittances such that a transmittance in the near-ultraviolet region of 363 to 393 nm is 10% or less, a transmittance in the visible region of 404 nm and 633 nm is about 50%, an average transmittance in a wavelength of 410 to 630 nm is about 85%, and a transmittance in the near-infrared region of 700 to 800 nm is about 5% or less.

The spectral transmittance curve of the absorption layer illustrated in FIG. 2 does not have the incident angle dependence of incident light almost at all. Therefore, by including the above-described absorption layer, it is possible to obtain a stabilized spectral transmittance curve, with respect to divergent and focused incident lights as well, in a boundary region between the visible region and the near-ultraviolet region, and a boundary region between the visible region and the near-infrared region.

Further, the absorption layer contains at least the NIR absorbent (DA) and the transparent resin (B). As the transparent resin (B), it is possible to use various resin materials. For example, there can be cited an acrylic resin, an epoxy resin, an ene-thiol resin, a polycarbonate resin, a polyether resin, a polyarylate resin, a polysulfone resin, a polyethersulfone resin, a polyparaphenylene resin, a polyarylene ether phosphine oxide resin, a polyimide resin, a polyamide-imide resin, a polyolefin resin, a cyclic olefin resin, a polyester resin, and the like. As the transparent resin, one kind may be used solely, or two or more kinds may be mixed and used.

From the above resins, from viewpoints of transparency, solubility of the NIR absorbent (DA), the UV absorbent (DU), and the like to the transparent resin (B), and heat resistance, the transparent resin is preferably a resin having a high glass transition point (Tg). Concretely, the transparent resin is preferably one or more kinds selected from a polyester resin, a polycarbonate resin, a polyethersulfone resin, a polyarylate resin, a polyimide resin, and an epoxy resin. Further, the transparent resin is more preferably one or more kinds selected from a polyester resin and a polyimide resin. As the polyester resin, a polyethylene terephthalate resin, a polyethylene naphthalate resin, or the like is preferable.

A ratio of the total amount of the NIR absorbent (DA) and the UV absorbent (DU) with respect to the total amount of the absorbents in the absorption layer is preferably 3 to 100 mass %. Further, it is preferable that the total amount of the NIR absorbent (DA) and the UV absorbent (DU) with respect to 100 parts by mass of the transparent resin (B) is preferably 0.01 to 20 parts by mass, more preferably 0.05 to 15 parts by mass, and still more preferably 1 to 10 parts by mass.

<Reflection Layer>

If the optical filter of the present embodiment is configured such that only the absorption layer containing the aforementioned NIR absorbent (DA), or the aforementioned NIR absorbent (DA) and UV absorbent (DU) exhibits wavelength-selective light cut-off performance, the cut-off performance of incident light in the near-ultraviolet region of about 350 to 390 nm, and the near-infrared region of about 800 to 1150 nm, out of the incident light in a wavelength of 350 to 1150 nm to which a solid-state image sensing device with RGB color filters has sensitivity, is insufficient. Therefore, the present filter further includes a reflection layer formed of a dielectric multilayered film obtained by alternately stacking a dielectric film with low refractive index and a dielectric film with high refractive index. Since the present filter includes the reflection layer, it is possible to improve the cut-off performance of light at unnecessary wavelength, and the solid-state image sensing device with RGB color filters can detect only light within the visible region of about 400 to 700 nm. Note that hereinbelow, the dielectric film with high refractive index is also referred to as "high-refractive index film", and the dielectric film with low refractive index is also referred to as "low-refractive index film".

The reflection layer has large incident angle dependence in which a spectral transmittance curve with respect to obliquely incident light changes by depending on the incident angle, when compared to the absorption layer. For this reason, the incident angle dependence of the present filter including the reflection layer and the absorption layer tends to appear, in a dominant manner, due to the incident angle dependence of the reflection layer. Further, the reflection layer also has polarization dependence such that as an angle of incident light increases, a difference in spectral transmittance curves is generated due to polarization components. Therefore, the present filter is designed to maintain the spectral transmittance curve in the visible region obtained by the absorption layer as much as possible and to improve the cut-off performance of light at unnecessary wavelength, without allowing the incident angle dependence and the polarization dependence to exert influence on color reproducibility of a color image of an imaging device.

As described above, the reflection layer is formed of the dielectric multilayered film formed by alternately stacking the high-refractive index film (refractive index: $n_H$) and the low-refractive index film (refractive index: $n_L$) with film thicknesses $d_H$ and $d_L$ each of which is about the same as or less than the wavelength of the incident light. A condition where reflectivity $R(\lambda_0)$ at a wavelength $\lambda_0$ in the vertical incidence (incident angle $\theta=0°$) becomes the maximum in the reflection layer, is that the reflection layer is configured in a manner that the Fresnel reflections which occur at interfaces of the dielectric films are reinforced by optical interference. Concretely, the reflection layer has a configuration in which an optical film thickness (refractive index n×film thickness d) of each dielectric film becomes $\lambda_0 \times (2m-1)/4$. Here, m is a natural number, and when m=1, the optical film thickness takes a minimum value of $\lambda_0/4$. When the used dielectric material in the reflection layer is transparent in a use wavelength region, the incident light other than reflected light transmits through the reflection layer, so that a transmittance $T(\lambda_0) = 1 - R(\lambda_0)$ at the wavelength $\lambda_0$ becomes the minimum transmittance.

Further, the Fresnel reflectivity at the interface of the dielectric film is represented by $(n_H - n_L)^2/(n_H + n_L)^2$, and by a combination of two kinds of dielectric materials having a large refractive index difference $(n_H - n_L)$, and having a small average refractive index $(n_H + n_L)/2$, reflectivity in a reflection wavelength band increases. Because of the same reason, a refractive index $n_s$ of a transparent substrate made of an optical glass, an optical resin or the like which is transparent in the visible region, is generally about 1.4 to 1.6, so that by using a high-refractive index dielectric having a refractive index $n_H$ which is larger than the refractive index $n_s$, for a dielectric film at an interface of the transparent substrate and a dielectric film at an interface of the air having a refractive index $n_0$=1, and setting a number of layers to (2p+1), high reflectivity can be obtained with a small number of layers, which is preferable. Here, p is a natural number. At this time, the reflectivity R ($\lambda_0$) at the wavelength $\lambda_0$ is represented by the following formula (1).

$$R(\lambda_0) = \left\{ \frac{(n_H/n_L)^{2p} \times (n_H^2/n_s) - 1}{(n_H/n_L)^{2p} \times (n_H^2/n_s) + 1} \right\}^2 \quad (1)$$

Namely, as the number of layers (2p+1) of the multilayered film increases, the reflectivity R ($\lambda_0$) increases. Further, if it is defined that $g=\lambda_0/\lambda$, the maximum reflection wavelength is represented by $\lambda=\lambda_0/(2m-1)$, in which g takes an odd number, and a reflection bandwidth $\Delta g$ in which the reflectivity is 50% or more in which the maximum reflection wavelength is set as a center, is represented by a formula (2). Note that the entire reflection bandwidth corresponds to 2×$\Delta g$.

$$\Delta g = \frac{2}{\pi} \mathrm{Sin}^{-1}\left(\frac{n_H - n_L}{n_H + n_L}\right) = \frac{2}{\pi} \mathrm{Sin}^{-1}\left\{\frac{(n_H/n_L) - 1}{(n_H/n_L) + 1}\right\} \quad (2)$$

Namely, as a refractive index ratio $n_H/n_L$ increases, it is possible to obtain a wide reflection bandwidth $\Delta g$ with a smaller number of layers, and to obtain a lower transmittance, when compared based on the same number of layers. Therefore, a combination of dielectric materials having a large refractive index ratio $n_H/n_L$, is effective as a reflection layer having a high light blocking property. Note that when the present specification simply describes "reflection band" or "reflection bandwidth", the term indicates a reflection band or a reflection bandwidth having a reflectivity of 50% or more (namely, a transmittance of 50% or less), unless otherwise stated.

Figure 3A:
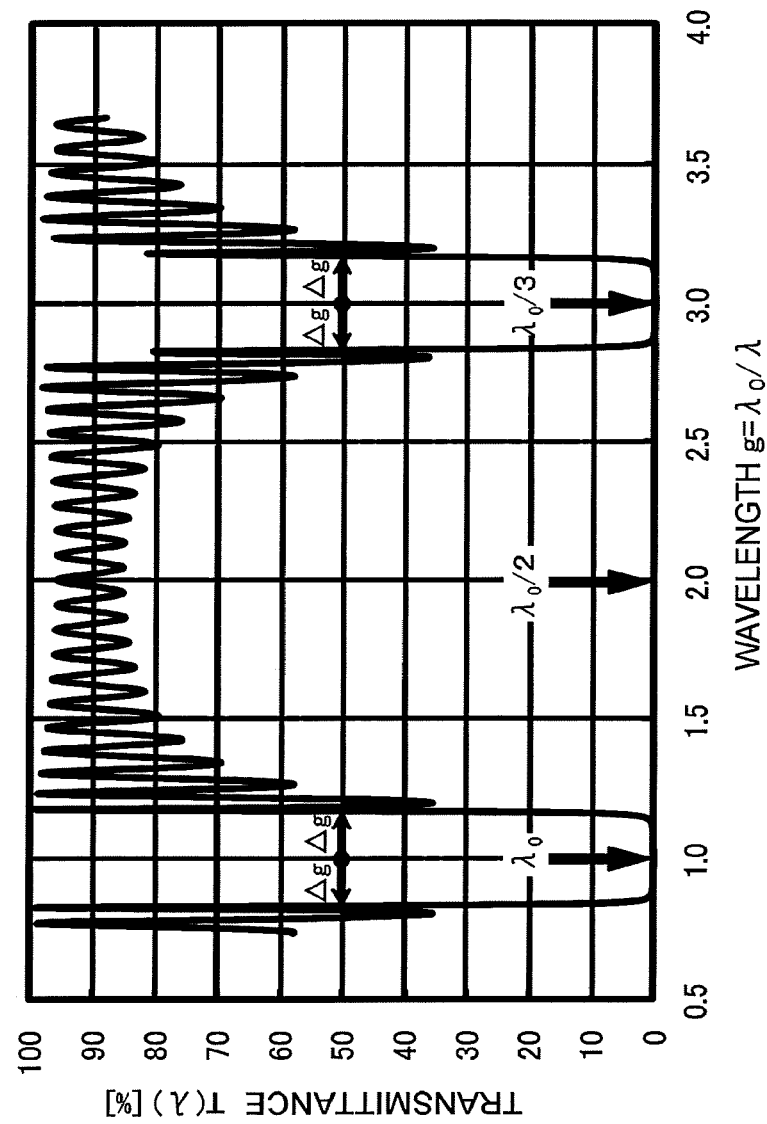
FIG. 3A is a graph illustrating a calculation result of a spectral transmittance when 21 layers of dielectric films with high refractive index $n_H$=2.35 and low refractive index $n_L$=1.45 are alternately stacked on a transparent substrate with a refractive index $n_s$=1.5, so that an optical film thickness becomes $\lambda_0$/4 with respect to a wavelength $\lambda_0$, in which a horizontal axis is described as g=$\lambda_0$/λ with respect to a wavelength λ.
Figure 3B:
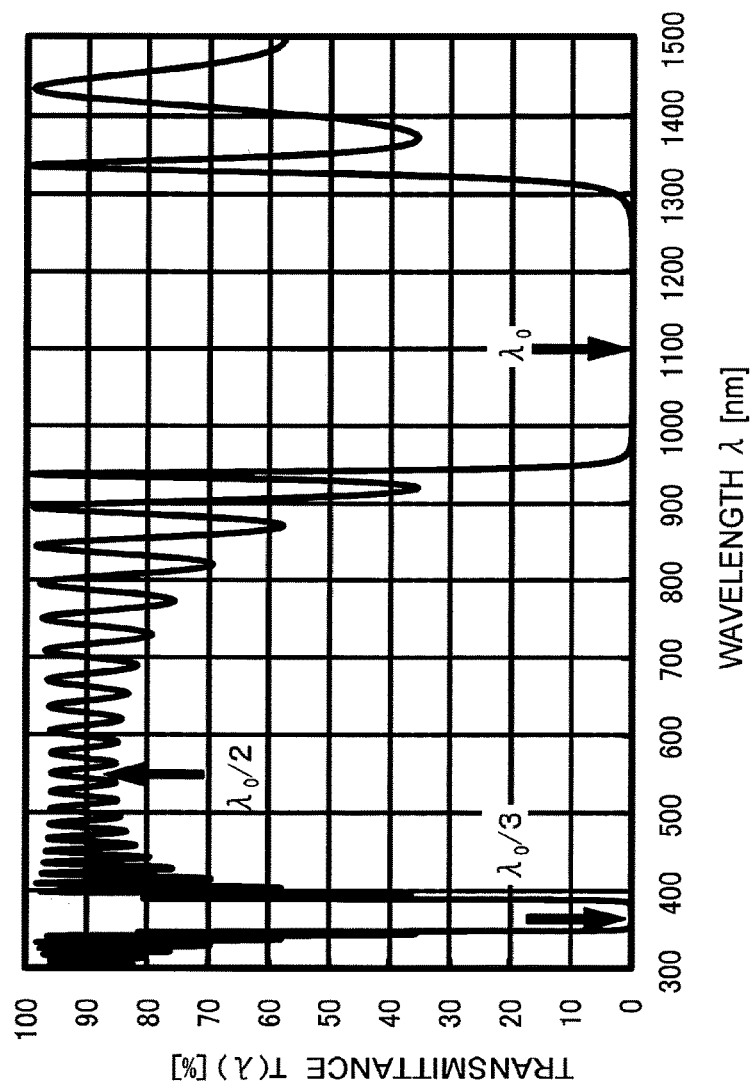
FIG. 3B is a graph illustrating the calculation result in FIG. 3A in which a horizontal axis is described by the wavelength λ.

FIG. 3A illustrates a calculation result of a spectral transmittance when, on a transparent substrate having the refractive index $n_s$=1.5, 21 layers of a dielectric film with $n_H$=2.35 and a dielectric film with $n_L$=1.45 are alternately stacked so that each of optical film thicknesses $n_H \times d_H$ and $n_L \times d_L$ becomes $\lambda_0/4$ with respect to $\lambda_0$=1100 nm. Here, a wavelength on a horizontal axis is indicated as $g=\lambda_0/\lambda$. The maximum reflectivity (namely, the minimum transmittance) is obtained when g=1 ($\lambda=\lambda_0$), and when g=3 ($\lambda=\lambda_0/3$), and a reflection bandwidth $\Delta g$=0.152 is obtained. Note that when the present specification describes the refractive index regarding the transparent substrate and the absorption layer, the term indicates a refractive index with respect to light at a wavelength of 589 nm at 20° C., unless otherwise stated. FIG. 3B is a graph representing a horizontal axis by a wavelength $\lambda$, and illustrates the same calculation result as that of FIG. 3A. In this example, a reflection band having a reflectivity of 50% or more is formed in a wavelength of about 950 to 1320 nm in the vicinity of the wavelength $\lambda_0$=1100 nm in the near-infrared region, and a reflection band having a reflectivity of 50% or more is formed in a wavelength of about 340 to 390 nm in the vicinity of the wavelength $\lambda=\lambda_0/3$=367 nm in the near-ultraviolet region. In the above-described calculation, the refractive index with respect to the change in the wavelength is supposed to be constant, but, an actual refractive index of dielectric material has a wavelength dependence (dispersion) peculiar to the material, in which the refractive index becomes higher as the wavelength becomes shorter, and the optical film thickness increases by an amount of the wavelength dependence. For this reason, the reflection band of g=3±$\Delta g$ in which the wavelength of g=3 is $\lambda_0/3$, shifts to the longer wavelength side so as to be close to the reflection band of g=1±$\Delta g$ in which the wavelength of g=1 is $\lambda_0$.

Here, a design in which the dielectric multilayered film configuring the reflection layer is formed by alternately stacking the high-refractive index film and the low-refractive index film so that the optical film thickness becomes $\lambda_0/4$ with respect to the wavelength $\lambda_0$ in the near-infrared region, is considered. At this time, by utilizing, in this design, the reflection bands generated in the vicinity of the wavelength $\lambda_0$ in the near-infrared region and in the vicinity of the wavelength $\lambda_0/3$ in the near-ultraviolet region, the transmitted light in the wavelength region which cannot be sufficiently absorbed by the UV absorbent (DU) and the NIR absorbent (DA), can be cut-off in the wavelength of 400 nm or less and the wavelength of 700 nm or more. Concretely, the design employs a configuration of the dielectric multilayered film in which the reflection band of g=1 (maximum reflection wavelength $\lambda=\lambda_0$) is positioned in the near-infrared region in which the light thereof needs to be cut-off, and the reflection band of g=3 (maximum reflection wavelength $\lambda=\lambda_0/3$) is positioned in the near-ultraviolet region in which the light thereof needs to be cut-off, resulting in that the number of layers can be reduced, and the total film thickness can be reduced. Such a design can be realized by a first reflection layer (UA1) to be described later. Consequently, it is possible to obtain an optical filter capable of effectively cutting-off the light at unnecessary wavelength which cannot be sufficiently cut-off by the absorption peculiar to the material by the absorbents.

In order to cut-off the light in the near-infrared region of about 800 to 1150 nm, which cannot be cut-off by the absorption layer containing only the NIR absorbent (DA) or only the UV absorbent (DU) and the NIR absorbent (DA), the reflection layer of the present filter needs to employ the following design. Specifically, the reflection layer cuts-off the light because of reflection action realized by the dielectric multilayered film with the optical film thickness of $\lambda_0/4$ with respect to the single wavelength $\lambda_0$, so that a reflection bandwidth $\Delta\lambda_{NIR}$ in which the reflectivity becomes 50% or more (the transmittance becomes 50% or less) is required to be 350 nm or more. Further, when the shift of the reflection wavelength band to the shorter wavelength side in accordance with the oblique incidence up to the incident angle of 30° is taken into consideration, the dielectric multilayered film configuring the reflection layer preferably has the reflection bandwidth $\Delta\lambda_{NIR}$ in the 0° incidence of about 400 nm or more.

A configuration in which the dielectric multilayered film is formed by stacking, on the transparent substrate with the refractive index $n_s$=1.50, dielectric films with the optical film thickness of $\lambda_0/4$ ($\lambda_0$=1000 nm) in an order of refractive index $n_H$, $n_L$, . . . , $n_L$, $n_H$, for example, is considered. At this time, the dielectric multilayered film is limited to be configured by a combination of dielectric materials satisfying "refractive index ratio $n_H/n_L$>1.7", in order to obtain the reflection bandwidth $\Delta\lambda_{NIR}$ of 400 nm or more, as a result of calculating the spectral transmittance in the near-ultraviolet region and the near-infrared region by changing the numerical values of $n_H$ and $n_L$ and the number of layers. Meanwhile, when the dielectric multilayered film is configured by the combination of dielectric materials satisfying the "refractive index ratio $n_H/n_L \leq 1.7$", even if the number of layers is increased, it is not possible to widen the reflection bandwidth $\Delta\lambda_{NIR}$ and to obtain the reflectivity of 99% or more (namely, the cut-off property realizing 1% or less of transmittance). Note that the $\Delta\lambda_{NIR}$ means the reflection bandwidth in the near-infrared region of the reflection layer in the present filter.

Therefore, when the dielectric multilayered film uses practical high/low-refractive index dielectric materials satisfying the "refractive index ratio $n_H/n_L \leq 1.7$", which is relatively large, the following configuration may also be employed. Specifically, the reflection layer is configured by dielectric multilayered films with two types of optical film thicknesses $\lambda_0/4$ in which there are different maximum reflection wavelengths $\lambda_0$ in the reflection band. Further, the respective dielectric multilayered films may be designed such that, for example, the reflection bandwidth in the near-infrared region generated by one dielectric multilayered film is set to about 200 nm, and the reflection bandwidth $\Delta\lambda_{NIR}$ of about 400 nm is secured by the two types of dielectric multilayered films. Concretely, two types of dielectric multilayered films including a second reflection layer (A2) for the reflection band of about 750 to 950 nm on the shorter wavelength side in the near-infrared region, and a first reflection layer (UA1) for the reflection band of about 950 to 1150 nm on the longer wavelength side in the near-infrared region, are used. Further, it is configured such that the reflection band includes the wavelength λLo (DA_T50%) of the NIR absorbent (DA), to thereby reflect the light in the near-infrared region.

Table 1 is a table illustrating a relation between the refractive index ratio $n_H/n_L$ and the number of layers of the dielectric multilayered film when the reflection bandwidth satisfying the transmittance condition in the table in the vicinity of the wavelength $\lambda_0=1000$ nm in the near-infrared region becomes 200 nm, through the aforementioned calculation.

TABLE 1

| Transmittance | Number of layers | | | | |
| --- | --- | --- | --- | --- | --- |
| | 21 layers | 31 layers | 41 layers | 51 layers | 61 layers |
| 0.1% or less | 1.59 | 1.47 | 1.42 | 1.40 | 1.39 |
| 0.01% or less | 1.74 | 1.55 | 1.48 | 1.42 | 1.41 |
| 0.001% or less | — | 1.63 | 1.53 | 1.47 | 1.43 |
| 0.0001% or less | — | 1.74 | 1.60 | 1.52 | 1.47 |

As is apparent from Table 1, one dielectric multilayered film can obtain the reflection bandwidth realizing the transmittance of 0.1% or less (the reflectivity of 99.9%) in the band of 200 nm or more, even if the number of layers is relatively small to be 21 to 31. Specifically, in the one dielectric multilayered film, on condition that the high/low-refractive index dielectric materials having the refractive index ratio $n_H/n_L$ of 1.47 or more are used, as the refractive index ratio $n_H/n_L$ is larger, a higher cut-off performance can be obtained with a small number of layers.

Further, one dielectric multilayered film has a reflection bandwidth $\Delta\lambda_{NUV}$, also in the near-ultraviolet region at the wavelength $\lambda_0/3$ corresponding to g=3, which corresponds to twice the width Δg that is the reflection bandwidth in the near-infrared region at the wavelength $\lambda_0$ corresponding to g=1. Note that the $\Delta\lambda_{NUV}$ means the reflection bandwidth in which the reflectivity becomes 50% or more (the transmittance becomes 50% or less) in the near-ultraviolet region of the reflection layer in the present filter. Further, the actual reflection bandwidth $\Delta\lambda_{NUV}$ in which the refractive index wavelength dispersion is taken into consideration, becomes wider than the reflection bandwidth when the refractive index wavelength dispersion is not taken into consideration.

The transmittance in the reflection band required for the reflection layer differs depending on the spectral sensitivity of the solid-state image sensing device with RGB color filters, or a dynamic range of video signals including a noise of a signal processing circuit. If an example in which one dielectric multilayered film is formed of 31 layers or less, and realizes the reflection band with the transmittance of 0.1% or less, is cited a dielectric multilayered film having a combination of $SiO_2$ with $n_L \leq 1.46$, and $TiO_2$ with $n_H \geq 2.15$, as dielectric film materials having the refractive index ratio $n_H/n_L$ of 1.47 or more in the near-infrared region of 700 to 1200 nm, and which are transparent and have stabilized optical characteristics in the wavelength of 400 to 700 nm. Note that if a fluoride such as $Na_5Al_3F_{14}$, $Na_3AlF_6$, or $MgF_2$, is used, other than $SiO_2$, as the low-refractive index film, it is possible to obtain $n_L \leq 1.38$. Further, if a material including an aggregate of core-shell-type hollow particles having a particle diameter of 20 nm or less and in which a core substance (core) is a hole, and a shell substance (shell) is made of $SiO_2$, is used, it is possible to obtain a level of $n_L=1.30$. Further, if $Ta_2O_5$, $Nb_2O_5$, ZnS, ZnSe, or the like is used, other than $TiO_2$, as the high-refractive index film, it is possible to obtain $n_H \geq 2.15$.

Note that in the dielectric multilayered film, with respect to the reflection bands when g=3 and when g=1, at a wavelength $\lambda_t=\lambda_0/(2m)$ corresponding to an even number value of g=2m, such as a wavelength in an intermediate region between the reflection band when g=3 and the reflection band when g=1, each dielectric film has the optical film thickness $\lambda_0/4=m\times(\lambda_t/2)$. In this case, the optical interference of Fresnel reflections at the interfaces of the respective dielectric films does not occur, resulting a reflectivity same as that of the Fresnel reflection at an interface between the transparent substrate and the air is obtained such that the reflectivity is substantially the same as the reflectivity obtained when the configuration having no dielectric multilayered film. Further, although a wavelength region ranging from g=3−Δg to g=1+Δg is a transmission band, at a wavelength different from the wavelength $\lambda_t=\lambda_0/(2m)$, the optical interference intensity of the Fresnel reflections which occur at the interfaces of the respective dielectric films changes in accordance with the wavelength, and a periodic transmission variation (ripple) as illustrated in FIG. 3A appears. In order to reduce the ripple in the visible transmission band as above to improve the transmittance, it is effective that the dielectric multilayered film employs a configuration in which a dielectric film whose optical film thickness is smaller than $\lambda_0/4$ is added to an interface between the dielectric multilayered film with (2p+1) layers and the transparent substrate or the air. Further, the dielectric multilayered film may also use a dielectric material having an intermediate refractive index such as $Al_2O_3$ or $ZrO_2$, other than the aforementioned high or low refractive index dielectric materials. Further, the reflection layer can reduce an amplitude of the transmittance variation or the residual reflection by employing a configuration in which the layer is divided into dielectric multilayered films in which the design wavelength $\lambda_0$ of the optical film thickness $\lambda_0/4$ is shifted, a configuration in which the optical film thickness of each dielectric film is varied by about ±10% or less from $\lambda_0/4$, or the like.

As described above, in the present embodiment, the reflection layer can be configured to include two types of reflection layers, namely, the first reflection layer (UA1) and the second reflection layer (A2). Hereinafter, the incident angle dependence of this reflection layer will be described.

When light at a wavelength λ is incident at an incident angle θ from the air on the reflection layer formed of the dielectric multilayered film, an incident angle $\theta_H$ and an incident angle $\theta_L$ in the high-refractive index film (refractive index: $n_H$) and the low-refractive index film (refractive index: $n_L$) can be related by the following formula, based on Snell's law of refraction.

$$\sin(\theta) = n_H \times \sin(\theta_H) = n_L \times \sin(\theta_L) \quad (3)$$

Regarding the incident light, with respect to an incident plane including a normal line of an incident substrate plane and an incident light azimuth vector, a p polarization (TM polarization) having an optical electric field vibration within the incident plane and an s polarization (TE polarization) having an optical electric field vibration orthogonal to the incident plane, are defined. Effective refractive indices η (p) and η (s) with respect to the respective polarization components are different, and are related to $n_H$ and $n_L$ by the following formulas, respectively. Note that $\eta_H$ (p) indicates the effective refractive index with respect to the p polarization in the high-refractive index film, $\eta_L$ (p) indicates the effective refractive index with respect to the p polarization in the low-refractive index film, $\eta_H$ (s) indicates the effective refractive index with respect to the s polarization in the high-refractive index film, and $\eta_L$ (s) indicates the effective refractive index with respect to the s polarization in the low-refractive index film.

$$\eta_H(p) = n_H/\cos(\theta_H), \eta_H(s) = n_H \times \cos(\theta_H) \quad (4a)$$

$$\eta_L(p) = n_L/\cos(\theta_L), \eta_L(s) = n_L \times \cos(\theta_L) \quad (4b)$$

Further, optical path length phase differences $\delta_H$ and $\delta_L$ of the respective dielectric films with high refractive index and low refractive index exerting an influence on the interference of the Fresnel reflections which occur at the interfaces of the dielectric films, can be described as the following formulas in accordance with the oblique incidence, and thus both of them are reduced.

$$\delta_H = 2\pi \times n_H \times d_H \times \cos(\theta_H)/\lambda \quad (5a)$$

$$\delta_L = 2\pi \times n_L \times d_L \times \cos(\theta_L)/\lambda \quad (5b)$$

Specifically, the optical film thickness $n_H d_H = n_L d_L = \lambda_0/4$ when the incident angle is 0°, changes to $(\lambda_0/4) \times \cos(\theta_H)$ and $(\lambda_0/4) \times \cos(\theta_L)$ when the incident angle is θ (≠0°), so that the wavelength $\lambda_0$ with the maximum reflectivity is approximately shifted to the shorter wavelength side of $\lambda_0 \times \{\cos(\theta_H) + \cos(\theta_L)\}/2$. Note that $\delta_H$ indicates the optical path length phase difference of the high-refractive index film, and $\delta_L$ indicates the optical path length phase difference of the low-refractive index film.

Further, the reflection bandwidth Δg having the reflectivity of 50% or more, is also different between the polarization components of the incident light, namely, the p polarization and the s polarization. When, in the formula (2), $\eta_H$ (p) and $\eta_H$ (s) in the formula (4a) are used instead of $n_H$, and $\eta_L$ (p) and $\eta_L$ (s) in the formula (4b) are used instead of $n_L$, the refractive index ratio ($n_H/n_L$) becomes a value as a result of multiplication by $\cos(\theta_L)/\cos(\theta_H)$ in the p polarization, and the ratio becomes a value as a result of multiplication by $\cos(\theta_H)/\cos(\theta_L)$ in the s polarization. Here, the relation of $n_H > n_L$ is satisfied, at the time of oblique incidence (θ>0°), the relation of $\theta_L > \theta_H$ is satisfied based on the formula (3), and $\cos(\theta_L) < \cos(\theta_H)$ is satisfied, so that in accordance with the increase in the incident angle θ, the value of ($n_H/n_L$) decreases in the p polarization, and it increases in the s polarization. Therefore, based on the vertical incidence (θ=0°), as the incident angle θ increases, the reflection bandwidth Δg (s) with respect to the s polarization is widened, and the reflection bandwidth Δg (p) with respect to the p polarization is reduced. Further, the effective refractive indices have the polarization dependence described in the formula (4a) and the formula (4b) according to the incident angle θ, so that the reflectivity R ($\lambda_0$) at the wavelength $\lambda_0$, represented in the formula (1), at which the maximum reflectivity is obtained, also changes by depending on the incident polarizations. For this reason, as the incident angle θ increases, the reflectivity R ($\lambda_0$) increases with respect to the s polarization, and it decreases with respect to the p polarization.

Specifically, the wavelength λSh and the wavelength λLo (wherein λSh<λLo) at which the transmittance becomes 50% in the near-infrared reflection bandwidth $\Delta\lambda_{NIR}$ shifts to the shorter wavelength side in accordance with the increase in the incident angle θ, and the shift amount is different according to the incident polarizations (p, s). Here, the shortest wavelength when the wavelength λSh is shifted in accordance with the increase in the incident angle corresponds to a wavelength λSh (s) of the s polarization at the maximum incident angle. Further, the shortest wavelength when the wavelength λLo is shifted in accordance with the increase in the incident angle corresponds to a wavelength λLo (p) of the p polarization at the maximum incident angle. As described above, a target of the polarization component of the shortest wavelength indicating the transmittance of 50% at the maximum incident angle is different between the region on the shorter wavelength side in the reflection band and the region on the longer wavelength side in the reflection band.

Next, in the second reflection layer (A2), a wavelength λSh (A2_Tp50%) on the shorter wavelength side and a wavelength λLo (A2_Tp50%) on the longer wavelength side, with respect to the p polarization, and a wavelength λSh (A2_Ts50%) on the shorter wavelength side and a wavelength λLo (A2_Ts50%) on the longer wavelength side, with respect to the s polarization, at which the transmittance becomes 50% in the near-infrared reflection band when the incident angle θ is changed from 0° to 30°, are calculated. At this time, the second reflection layer (A2) is designed so that a change in the spectral transmittance curve on the longer wavelength side in the visible region in the absorption layer containing the NIR absorbent (DA), becomes small in a change in the entire spectral transmittance curve of the optical filter caused by the incident angle dependence and the polarization dependence of the spectral transmittance in the second reflection layer (A2). In the design, it is preferable that, in the entire spectral transmittance curve of the optical filter, the change in the spectral transmittance curve on the longer wavelength side in the visible region (transition from transmission to cut-off), in particular, can be suppressed. Generally, in the reflection layer formed of the dielectric multilayered film, the spectral transmittance curve in which the transition from transmission to cut-off occurs, has a shift amount of changing to the shorter wavelength side, which increases in accordance with the increase in the incident angle θ, the s polarization component shifts greater than the p polarization component, and a difference in the shift amounts depends on the configuration of the dielectric multilayered film of the reflection layer. Here, it is preferable that the following relation is satisfied between the wavelength λSh (A2_Tp50%) and the wavelength λSh (A2_Ts50%) in the near-infrared reflection band described above.

$$0\ nm < \lambda Sh(A2\_Tp50\%) - \lambda Sh(A2\_Ts50\%) \le 20\ nm$$
(preferably 15 nm)

When the change in the spectral transmittance curve with respect to the incident light at the incident angle θ of 0° to 30° is suppressed, the second reflection layer (A2) of the optical filter of the present embodiment may be designed as follows. Specifically, in the second reflection layer (A2), the shortest wavelength λSh (A2_T50%) with the transmittance of 50% on the shorter wavelength side in the near-infrared reflection band when the incident angle θ=0°, shifts to the shorter wavelength side in accordance with the increase in the incident angle θ, and the s polarization component at the maximum incident angle θ=30°, namely, the above-described wavelength λSh (A2_Ts50%), corresponds to the shortest wavelength. For this reason, the second reflection layer (A2) is set to have a configuration of the dielectric multilayered film so that the wavelength λSh (A2_Ts50%) is positioned on the longer wavelength side of the wavelength λSh (DA_T50%). On the other hand, the spectral transmittance curve in which the transition from cut-off to transmission occurs, has a shift amount of changing to the shorter wavelength side, which increases in accordance with the increase in the incident angle θ, and the p polarization component shifts greater than the s polarization component. Therefore, the shortest wavelength λLo (A2_T50%) with the transmittance of 50% on the longer wavelength side in the near-infrared reflection band when the incident angle θ=0°, shifts to the shorter wavelength side in accordance with the increase in the incident angle θ, and the p polarization component at the maximum incident angle θ=30°, namely, the wavelength λLo (A2_Tp50%), corresponds to the shortest wavelength. For this reason, the first reflection layer (UA1) is set to have a configuration of the dielectric multilayered film so that the reflection band thereof includes the wavelength λLo (A2_Tp50%) when the incident angle θ=0° to 30°.

Further, in the first reflection layer (UA1), a wavelength λSh (A1_Tp50%) on the shorter wavelength side and a wavelength λLo (A1_Tp50%) on the longer wavelength side, with respect to the p polarization, and a wavelength λSh (A1_Ts50%) on the shorter wavelength side and a wavelength λLo (A1_Ts50%) on the longer wavelength side, with respect to the s polarization, at which the transmittance becomes 50% in the near-infrared reflection band when the incident angle θ is changed from 0° to 30°, are calculated. Further, the first reflection layer (UA1) and the second reflection layer (A2) are designed so that, at the maximum incident angle θ=30°, the shortest wavelength λSh (A1_Tp50%) with the transmittance of 50% with respect to the p polarization, on the shorter wavelength side in the near-infrared reflection band of the first reflection layer (UA1) satisfies a relation of λSh (A1_Tp50%)<λLo (A2_Tp50%), with respect to the wavelength λLo (A2_Tp50%) of the second reflection layer (A2). As described above, since the reflection layer uses the second reflection layer (A2) and the first reflection layer (UA1) in a combined manner, it is possible to secure the refection bandwidth Δλ$_{NIR}$ of 400 nm or more (in the near-infrared region) with respect to the incident light at the incident angle θ of 0° to 30°. Further, as a region is positioned further on the longer wavelength region in the reflection band, a shift amount to the shorter wavelength side of the spectral transmittance curve caused in accordance with the increase in the incident angle becomes larger. For this reason, the respective dielectric multilayered films are configured so that, at the incident angle θ=0°, the wavelength λLo (A2_T50%) of the second reflection layer (A2) is positioned on the longer wavelength side of a wavelength λSh (A1_T50%) of the first reflection layer (UA1). Specifically, if the dielectric multilayered films are designed to satisfy the relation of λSh (A1_T50%)<λLo (A2_T50%), the relation of λSh (A1_Tp50%)<λLo (A2_Tp50%) is satisfied, and it is possible to secure the predetermined wide near-infrared reflection bandwidth Δλ$_{NIR}$.

Note that in order to reduce the transmittance from the wavelength λ (DA_T$_{min}$) to the wavelength λLo (DA_T50%) of the absorption layer containing the NIR absorbent (DA) to 3% or less, the optical filter of the present embodiment preferably designs the second reflection layer (A2) so that a wavelength λSh (A2_T15%) on the shorter wavelength side at which the transmittance becomes 15% in the near-infrared reflection band when the incident angle θ=0° of the second reflection layer (A2) is positioned on the shorter wavelength side of the aforementioned wavelength λLo (DA_T15%). Further, in order to reduce the transmittance from the wavelength λ (DA_T$_{min}$) to the wavelength λLo (DA_T50%) to 0.3% or less, it is preferable to design the second reflection layer (A2) so that a wavelength λSh (A2_T1%) on the shorter wavelength side at which the transmittance becomes 1% in the near-infrared reflection band when the incident angle θ=0° of the second reflection layer (A2) is positioned on the shorter wavelength side of the aforementioned wavelength λLo (DA_T15%).

Further, it is preferable to design the first reflection layer (UA1) so that a wavelength λLo (A1_Tp15%) at which the transmittance of light of the p polarization component out of the incident light at the incident angle θ=30° becomes 15%, becomes a wavelength longer than the wavelength of 1150 nm, by taking the incident angle dependence and the polarization dependence of the spectral transmittance into consideration, also on the longer wavelength side in the near-infrared reflection band. Further, it is more preferable to design the first reflection layer (UA1) so that a wavelength λLo (A1_Tp5%) at which the transmittance of light of the p polarization component out of the incident light at the incident angle θ=30° becomes 5%, becomes a wavelength longer than the wavelength of 1150 nm. Specifically, in the first reflection layer (UA1), the shortest wavelength with the transmittance of 15% or the transmittance of 5% on the longer wavelength side in the near-infrared reflection band with respect to the incident light at the incident angle θ=0° to 30°, is the wavelength λLo (A1_Tp15%) or the wavelength λLo (A1_Tp5%) at which the transmittance of light of the p polarization component out of the incident light at the incident angle θ=30° becomes 15% or 5%. For this reason, the first reflection layer (UA1) is designed so that the wavelength λLo (A1_Tp15%) or the wavelength λLo (A1_Tp5%) is positioned on the longer wavelength side of the wavelength of 1150 nm. Note that the longest wavelength of the spectral sensitivity of the solid-state image sensing device is 1150 nm, and the optical filter of the present embodiment can suppress the influence of the incident angle dependence and the polarization dependence of the spectral transmittance curve in the first reflection layer (UA1), regarding the spectral transmittance curve of up to the wavelength of 1150 nm.

Further, when the second reflection layer (A2) and the first reflection layer (UA1) are arranged by being separated by an interval in which reflected light and transmitted light of the respective layers do not interfere with each other, the optical filter of the present embodiment may be designed as follows, in order to reduce the transmittance from the wavelength λSh (A1_T50%) to the wavelength λLo (A2_T50%) each being a boundary region of the near-infrared reflection band at the incident angle 0° of the second reflection layer (A2) and the first reflection layer (UA1), to a predetermined transmittance x % or less. Specifically, the present filter designs the second reflection layer (A2) and the first reflection layer (UA1) so that a wavelength λLo (A2_Tx %) on the longer wavelength side at which the transmittance becomes x % in the near-infrared reflection band of the second reflection layer (A2) at the incident angle θ=0°, is positioned on the longer wavelength side of a wavelength λSh (A1_Tx %) on the shorter wavelength side at which the transmittance becomes x % in the near-infrared reflection band of the first reflection layer (UA1) at the incident angle θ=0°. Here, x % is preferably 3% or less, and more preferably 1% or less.

Further, in a similar manner to the near-infrared reflection band of the first reflection layer (UA1), a wavelength λSh (U1_Tp50%) on the shorter wavelength side and a wavelength λLo (U1_Tp50%) on the longer wavelength side, with respect to the p polarization, and a wavelength λSh (U1_Ts50%) on the shorter wavelength side and a wavelength λLo (U1_Ts50%) on the longer wavelength side, with respect to the s polarization, at which the transmittance becomes 50% in the near-ultraviolet reflection band when the incident angle θ is changed from 0° to 30°, are calculated. Further, the first reflection layer (UA1) may be designed so that, when the incident angle θ is changed from 0° to 30°, the longest wavelength λLo (U1_T50%) at which the transmittance becomes 50% on the longer wavelength side in the near-ultraviolet reflection band is positioned on the shorter wavelength side of the wavelength λLo (DU_T50%) in the range of the wavelength of 400 to 420 nm at which the transmittance becomes 50% on the longer wavelength side of the maximum absorption wavelength λ (DU_$T_{min}$) of the absorption layer containing the UV absorbent (DU).

Further, the first reflection layer (UA1) cuts-off the incident light in the wavelength region from 350 nm to the maximum absorption wavelength λ (DU_$T_{min}$) which cannot be sufficiently absorbed by the absorption layer containing the UV absorbent (DU), out of the incident light in the wavelength of 350 to 400 nm transmitting through the RGB color filters formed for each pixel of the solid-state image sensing device. For this reason, the first reflection layer (UA1) is preferably designed so that, when the incident angle θ is changed from 0° to 30°, a wavelength λSh (U1_T50%) at the incident angle θ=0°, being the longest wavelength with the transmittance of 50% on the shorter wavelength side in the near-ultraviolet reflection band, is positioned on the shorter wavelength side of 350 nm. Note that the first reflection layer (UA1) can reduce the transmission of light in the wavelength region in the vicinity of 350 nm, also by the absorption on the shorter wavelength side in the near-ultraviolet region of the using dielectric (TiO$_2$) film, the reflection in the near-ultraviolet region of the second reflection layer (A2), and the like.

Next, concrete design examples of the first reflection layer (UA1) and the second reflection layer (A2) will be described. Note that the optical filter of the present example includes the transparent substrate, and it is premised that each of transparent substrates used for calculation employs a substrate which exhibits no light absorption and light scattering in the wavelength of 350 to 1150 nm. As the transparent substrate to be actually used, one which exhibits small optical absorption and scattering in the visible region can be used, as will be described later, and it may also be a substrate having a non-planar form such as a lens.

Table 2 represents a design example of the first reflection layer (UA1) formed on one surface of the transparent substrate having the refractive index $n_s$=1.51. A front surface of the reflection layer faces the air. The first reflection layer (UA1) in the present example is configured by 23 layers of TiO$_2$ films with $n_H$=2.36 and SiO$_2$ films with $n_L$=1.45, the films being alternately stacked so that each of optical film thicknesses $n_H d_H$ and $n_L d_L$ becomes about $\lambda_0$/4, with respect to the design wavelength $\lambda_0$=1033 nm, in order to generate reflection bands in the near-ultraviolet region of about 350 to 400 nm and the near-infrared region of about 850 to 1150 nm. Further, the first reflection layer (UA1) is configured in a manner that the optical film thickness of each layer in the film formed of 23 layers of TiO$_2$ and SiO$_2$ is shifted by about ±10% from $\lambda_0$/4, in order to reduce ripples in the visible transmission band. Further, in order to generate the effect of reducing ripples and preventing reflection in the visible transmission band of about 400 to 700 nm, the first reflection layer (UA1) is a dielectric multilayered film formed of 26 layers, in total, in which a SiO$_2$ film, and two layers of SiO$_2$ film and TiO$_2$ film, each having an optical film thickness smaller than $\lambda_0$/4, are added to an interface between the air and the film formed of 23 layers, and to an interface between the transparent substrate and the film formed of 23 layers, respectively.

TABLE 2

| Layer structure | Medium | Film thickness (nm) |
|---|---|---|
| Upper surface | Air | |
| 1 | SiO$_2$ | 96 |
| 2 | TiO$_2$ | 113 |
| 3 | SiO$_2$ | 189 |
| 4 | TiO$_2$ | 114 |
| 5 | SiO$_2$ | 191 |
| 6 | TiO$_2$ | 114 |
| 7 | SiO$_2$ | 192 |
| 8 | TiO$_2$ | 114 |
| 9 | SiO$_2$ | 191 |
| 10 | TiO$_2$ | 113 |
| 11 | SiO$_2$ | 189 |
| 12 | TiO$_2$ | 110 |
| 13 | SiO$_2$ | 179 |
| 14 | TiO$_2$ | 102 |
| 15 | SiO$_2$ | 169 |
| 16 | TiO$_2$ | 104 |
| 17 | SiO$_2$ | 180 |
| 18 | TiO$_2$ | 108 |
| 19 | SiO$_2$ | 176 |
| 20 | TiO$_2$ | 100 |
| 21 | SiO$_2$ | 164 |
| 22 | TiO$_2$ | 97 |
| 23 | SiO$_2$ | 169 |
| 24 | TiO$_2$ | 107 |
| 25 | SiO$_2$ | 36 |
| 26 | TiO$_2$ | 9 |
| Lower surface | Transparent substrate | |

Figure 4:
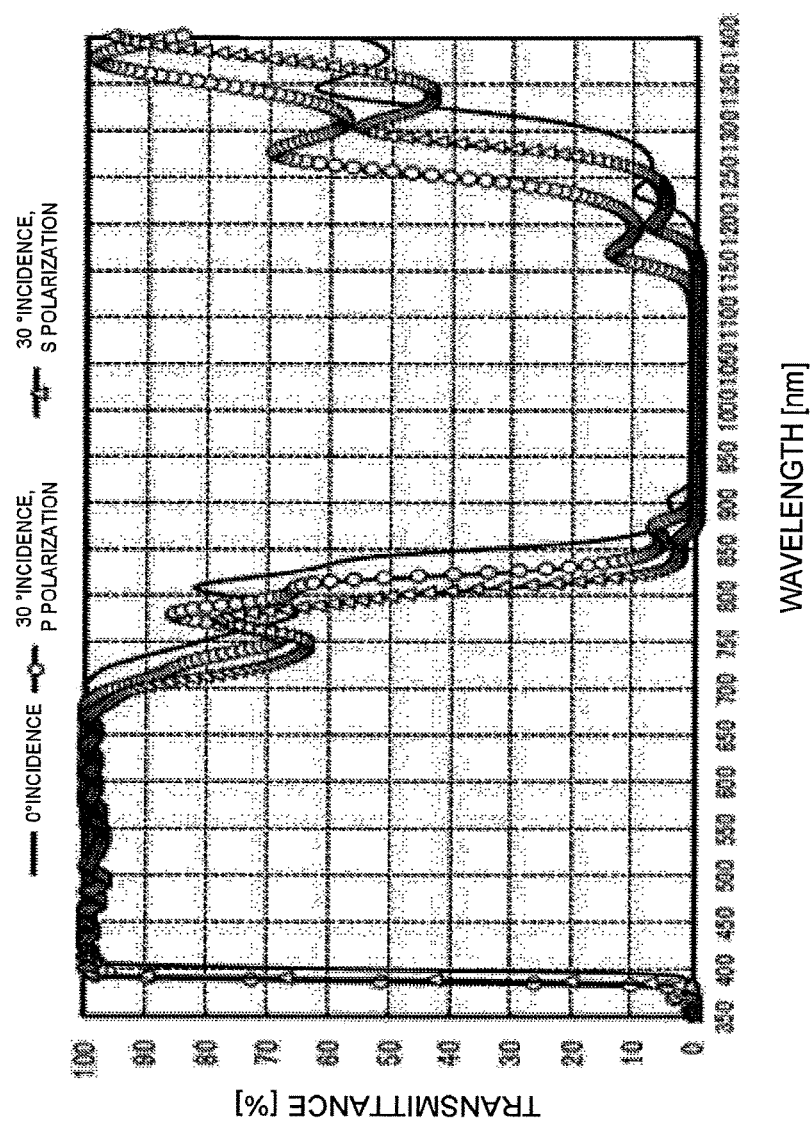
FIG. 4 is a graph illustrating a calculation result of spectral transmittances of a reflection layer formed of a dielectric multilayered film represented in Table 2.

FIG. 4 illustrates a result of calculating respective spectral transmittances at the incident angle θ=0°, for the p polarization at the incident angle θ=30°, and for the s polarization at the incident angle θ=30°, regarding the first reflection layer (UA1) represented in Table 2, by taking the refractive index wavelength dispersion of the TiO$_2$ film and the SiO$_2$ film into consideration. Note that although the calculation result does not take a reflection loss which is generated at an interface of one surface of the transparent substrate with the air into consideration, actually, it is possible to reduce a reflection loss in the visible region to the same level by the anti-reflection layer to be described later. As illustrated in FIG. 4, the first reflection layer (UA1) of the present design example has reflection bands having a transmittance of 50% or less in the near-infrared region of about 844 to 1256 nm, and the near-ultraviolet region of about 350 to 386 nm, and having a transmittance of 15% or less in the near-infrared region of about 862 to 1222 nm, and the near-ultraviolet region of about 350 to 382 nm, and exhibits an average transmittance of 98% or more in the visible region of 400 to 700 nm, with respect to the incident light at the incident angle θ=0° to 30°. When the first reflection layer (UA1) is configured by a multilayered film formed by alternately stacking 23 layers of $TiO_2$ and $SiO_2$ so that the optical film thickness becomes about $\lambda_0/4$, the minimum transmittance in the near-infrared reflection band is at a level of 0.02%, and, by increasing the number of layers, it is possible to further reduce the minimum transmittance to realize the minimum transmittance of less than 0.02%.

Table 3 represents a design example of the second reflection layer (A2), in the configuration in which the transparent substrate is provided, the first reflection layer (UA1) is provided on one surface of the transparent substrate, the second reflection layer (A2) is provided on the other surface of the transparent substrate, and on the second reflection layer (A2), the absorption layer formed by making the transparent resin (B) contain the NIR absorbent (DA) and the UV absorbent (DU) is provided. Here, an example where the absorption layer contains NIR775B as the NIR absorbent (DA), and SDA3382 as the UV absorbent (DU), is considered. At this time, the second reflection layer (A2) is designed to give a reflection band to about 800 to 950 nm including a wavelength in which the reflection band cannot be secured only by the absorption layer and the first reflection layer (UA1). The second reflection layer (A2) is configured by 21 layers formed by alternately stacking the $TiO_2$ film with $n_H$=2.37 and the $SiO_2$ film with $n_L$=1.45, so that each of the optical film thicknesses $n_H d_H$ and $n_L d_L$ becomes about $\lambda_0/4$, with respect to the design wavelength $\lambda_0$=940 nm. Further, the second reflection layer (A2) is configured in a manner that the optical film thickness of each layer in the film formed of 21 layers of $TiO_2$ and $SiO_2$ is shifted by about ±10% from $\lambda_0/4$, in order to reduce ripples in the visible transmission band. Further, in order to generate the effect of reducing ripples and preventing reflection in the visible transmission band of about 400 to 700 nm, the second reflection layer (A2) is a dielectric multilayered film formed of 27 layers, in total, in which a film formed of three layers of $SiO_2/TiO_2/SiO_2$, each having an optical film thickness smaller than $\lambda_0/4$, is added to an interface between the transparent substrate and the film formed of 21 layers, and to an interface between the absorption layer and the film formed of 21 layers, respectively. Note that a refractive index at the wavelength of 940 nm of the transparent substrate and the transparent resin of the absorption layer is set to 1.51.

TABLE 3

| Layer structure | Medium | Film thickness (nm) |
| --- | --- | --- |
| Upper surface | Transparent resin | |
| 1 | $SiO_2$ | 102 |
| 2 | $TiO_2$ | 8 |
| 3 | $SiO_2$ | 43 |
| 4 | $TiO_2$ | 106 |
| 5 | $SiO_2$ | 169 |
| 6 | $TiO_2$ | 96 |
| 7 | $SiO_2$ | 156 |
| 8 | $TiO_2$ | 92 |
| 9 | $SiO_2$ | 156 |
| 10 | $TiO_2$ | 91 |
| 11 | $SiO_2$ | 154 |
| 12 | $TiO_2$ | 91 |
| 13 | $SiO_2$ | 155 |
| 14 | $TiO_2$ | 92 |
| 15 | $SiO_2$ | 157 |
| 16 | $TiO_2$ | 94 |
| 17 | $SiO_2$ | 162 |
| 18 | $TiO_2$ | 99 |
| 19 | $SiO_2$ | 174 |
| 20 | $TiO_2$ | 106 |
| 21 | $SiO_2$ | 181 |
| 22 | $TiO_2$ | 107 |
| 23 | $SiO_2$ | 180 |
| 24 | $TiO_2$ | 110 |
| 25 | $SiO_2$ | 44 |
| 26 | $TiO_2$ | 9 |
| 27 | $SiO_2$ | 109 |
| Lower surface | Transparent substrate | |

Figure 5:
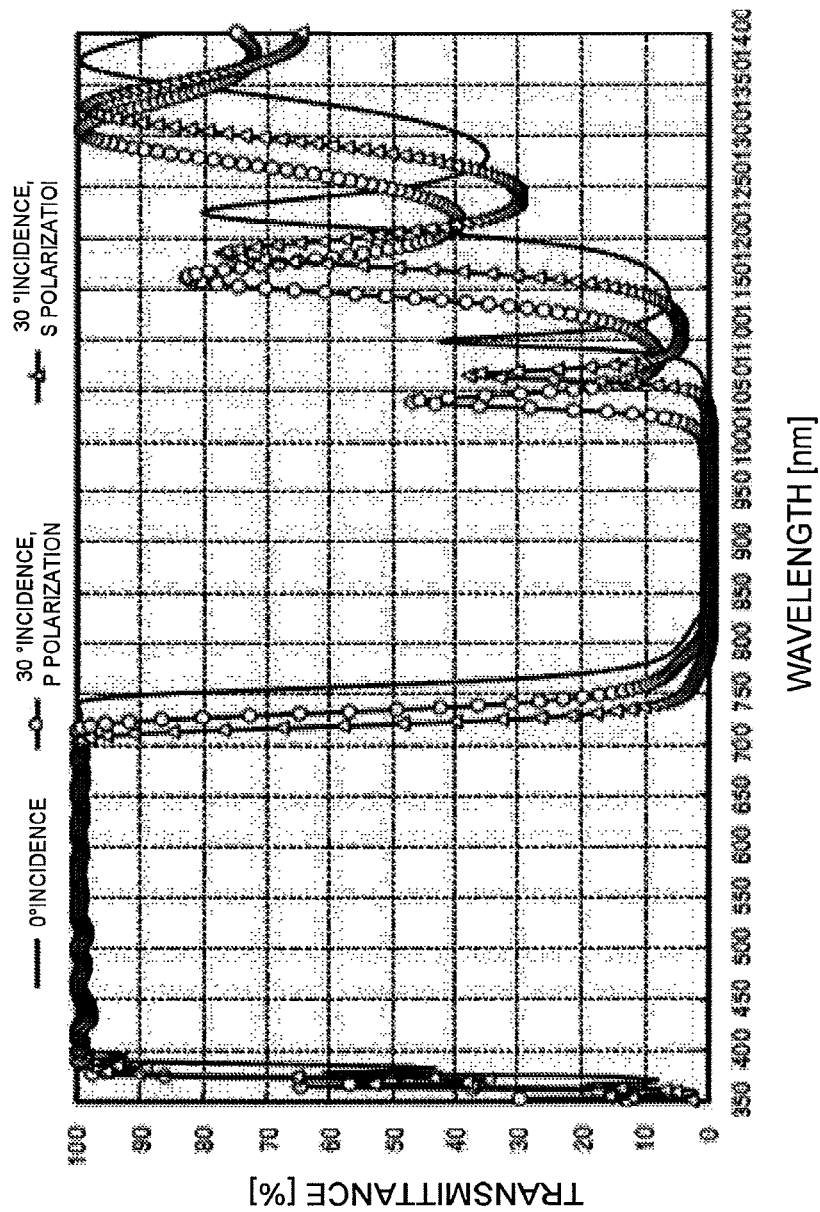
FIG. 5 is a graph illustrating a calculation result of spectral transmittances of a reflection layer formed of a dielectric multilayered film represented in Table 3.

FIG. 5 illustrates a result of calculating respective spectral transmittances at the incident angle θ=0°, for the p polarization at the incident angle θ=30°, and for the s polarization at the incident angle θ=30°, regarding the second reflection layer (A2) represented in Table 3, by taking the refractive index wavelength dispersion of the $TiO_2$ film and the $SiO_2$ film into consideration. Note that although the calculation result does not take the reflection loss which is generated at the interface between one surface of the transparent substrate and the air, and the interface between the surface of the absorption layer and the air into consideration, actually, it is possible to reduce the reflection loss in the visible region to the same level by the anti-reflection layer to be described later. As illustrated in FIG. 5, the second reflection layer (A2) of the present design example has a reflection band having a transmittance of 50% or less in the near-infrared region of about 760 to 1140 nm, and having a transmittance of 15% or less in the near-infrared region of about 774 to 1026 nm, and exhibits a transmittance of 95% or more in the visible region of 400 to 700 nm, with respect to the incident light at the incident angle θ=0° to 30°. When the second reflection layer (A2) is configured by a multilayered film formed by alternately stacking 21 layers of $TiO_2$ and $SiO_2$ so that the optical film thickness becomes about $\lambda_0/4$, the minimum transmittance in the near-infrared reflection band is at a level of 0.1%, and, by increasing the number of layers, it is possible to further reduce the minimum transmittance to realize the minimum transmittance of less than 0.1%.

Next, a calculation result of spectral transmittances of the optical filter including the first reflection layer (UA1) and the second reflection layer (A2), will be described. As illustrated in the examples of FIG. 1A and FIG. 1C, when the first reflection layer (UA1) and the second reflection layer (A2) are respectively formed on both principal surfaces of the absorption layer, the transparent substrate, or the like, there is a need to take interference of reflected lights generated between the two types of reflection layers into consideration, when the reflection layers are arranged so that an interval therebetween is shorter than a coherence length of the incident lights. On the other hand, when the reflection layers are arranged so that the interval therebetween is longer than the coherence length of the incident lights, no interference occurs, so that there is no need to take the interference of the reflected lights into consideration. In an imaging device having an optical filter mounted thereon, incident light on the imaging device from a subject is natural light having a short coherence length, so that when the optical filter includes the first reflection layer (UA1) and the second reflection layer (A2) respectively provided on both principal surfaces of an absorption layer, a transparent substrate, or the like, having a thickness of about 30 μm or more, spectral transmittances thereof are obtained through calculation in which the interference is not taken into consideration.

Figure 6:
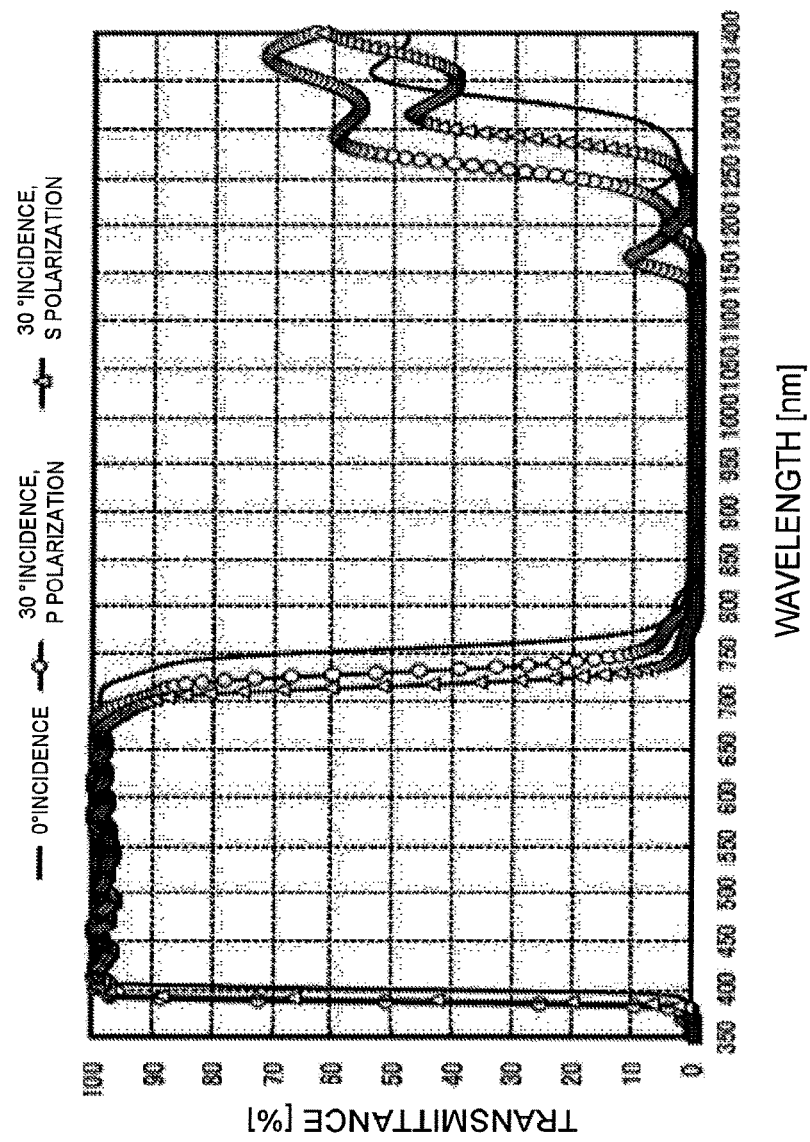
FIG. 6 is a graph illustrating a calculation result of spectral transmittances of a reflection-type filter in which the reflection layer formed of the dielectric multilayered film represented in Table 2 is formed on one surface of a transparent substrate, and the reflection layer formed of the dielectric multilayered film represented in Table 3 is formed on the other surface of the transparent substrate.

FIG. 6 illustrates a calculation result of spectral transmittance curves (at the incident angle θ=0°, for the p polarization at the incident angle θ=30°, and for the s polarization at the incident angle θ=30°) of the optical filter including the first reflection layer (UA1) and the second reflection layer (A2) in this case. Here, this calculation result corresponds to the case that in the optical filter 30 in FIG. 1C, the absorption layer 11 is formed only of a transparent resin containing no absorbent. As illustrated in FIG. 6, the present design example corresponds to a reflection-type filter which exhibits a transmittance of 50% or less in the near-ultraviolet region of about 350 to 386 nm and the near-infrared region of about 756 to 1272 nm, a transmittance of 15% or less in the near-ultraviolet region of about 350 to 382 nm and the near-infrared region of about 770 to 1244 nm, and an average transmittance of 98% or more in the visible region of 400 to 700 nm, with respect to the incident light at the incident angle θ=0° to 30°.

On the other hand, when the first reflection layer (UA1) and the second reflection layer (A2) are stacked on the same principal surface of the absorption layer, the transparent substrate, or the like, as illustrated in the examples of FIG. 1B and FIG. 1D, reflected lights at interfaces of respective dielectric multilayered films interfere with each other, so that the spectral transmittance can be calculated as a spectral transmittance of one optical interference multilayered film structure in which the first reflection layer (UA1) and the second reflection layer (A2) are continuously formed. At this time, there is a possibility that in the reflection-type filter in which the individually-designed first reflection layer (UA1) and second reflection layer (A2) are simply stacked, ripples are generated in the transmission band and the reflection band, which causes characteristic deterioration. In order to reduce the ripples caused by the stacking of the layers, the reflection-type filter preferably adjusts the film thickness of the dielectric film at the boundary between the first reflection layer (UA1) and the second reflection layer (A2), the interface between the reflection layer and the air, the interface between the reflection layer and the absorption layer, and the like, and the film thickness of each dielectric multilayered film.

Figure 7:
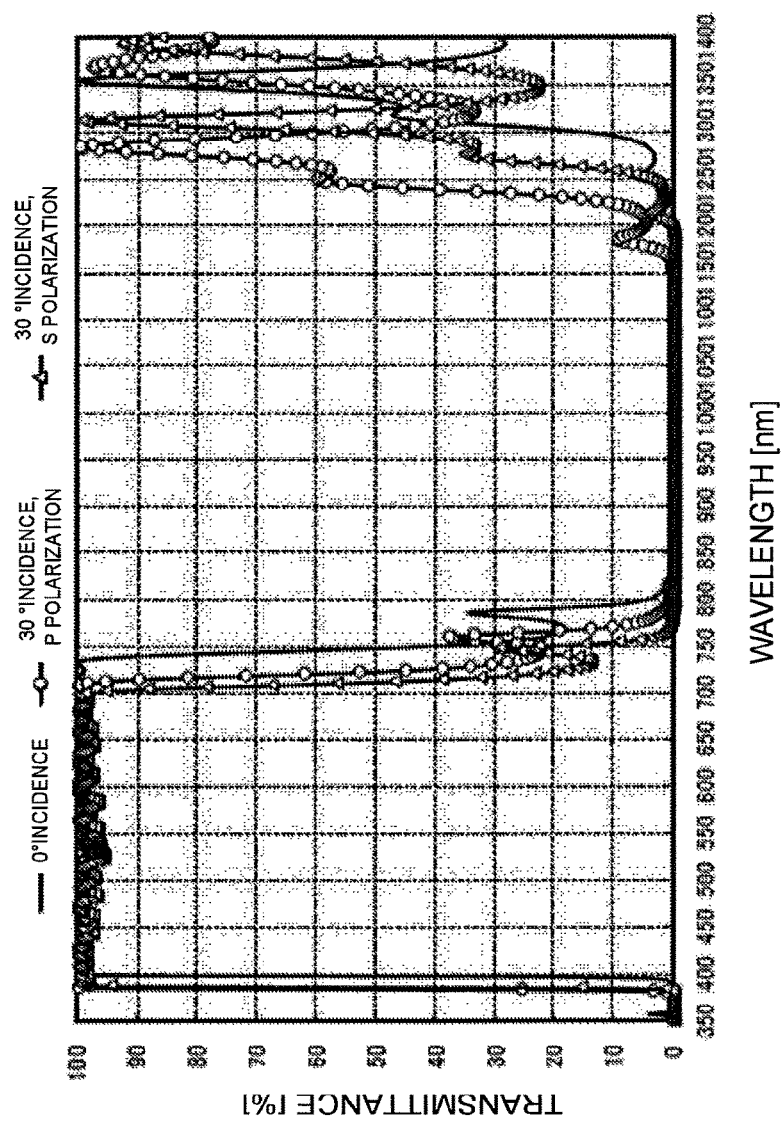
FIG. 7 is a graph illustrating a calculation result of spectral transmittances of a reflection-type filter in which the reflection layer formed of the dielectric multilayered film represented in Table 2 and the reflection layer formed of the dielectric multilayered film represented in Table 3 are integrally formed on one surface of a transparent substrate.

FIG. 7 illustrates a result of calculating spectral transmittance curves (at the incident angle θ=0°, for the p polarization at the incident angle θ=30°, and for the s polarization at the incident angle θ=30°) regarding a reflection layer formed of a dielectric multilayered film formed by continuously stacking the first reflection layer (UA1) and the second reflection layer (A2), namely, formed by alternately stacking 53 layers of the $TiO_2$ films and the $SiO_2$ films. Note that the calculation result in FIG. 7 indicates spectral transmittance curves of the dielectric multilayered film in which the first reflection layer (UA1) has a basic configuration of 23 layers having an optical film thickness of about $\lambda_0/4$ with respect to $\lambda_0=1060$ nm, and the second reflection layer (A2) has a basic configuration of 21 layers having an optical film thickness of about $\lambda_0/4$ with respect to $\lambda_0=925$ nm, and in order to improve the transmittance and to reduce the ripples in the visible region, the optical film thickness of each of the dielectric multilayered film represented in Table 2 and the dielectric multilayered film represented in Table 3 are adjusted. Although the spectral transmittance curves illustrated in FIG. 7 do not take the reflection loss which is generated at the interface of one surface of the transparent substrate with the air into consideration, actually, it is possible to reduce the reflection loss in the visible region to the same level by the anti-reflection layer to be described later.

As illustrated in FIG. 7, the reflection layer exhibits a transmittance of 50% or less in the near-ultraviolet region of about 350 to 384 nm and the near-infrared region of about 748 to 1240 nm, a transmittance of 15% or less in the near-ultraviolet region of about 350 to 382 nm and the near-infrared region of about 794 to 1226 nm, and an average transmittance of 98% or more in the visible region of 400 to 700 nm, with respect to the incident light at the incident angle θ=0° to 30°.

As described above, even in a case where the reflection layer is configured by forming the first reflection layer (UA1) and the second reflection layer (A2), in a separate manner, on both principal surfaces of the transparent substrate, or it is configured by integrally forming the layers on one principal surface of the transparent substrate, it is possible to obtain the reflection-type filter which cutting-off the incident light at the incident angle θ=0° to 30° so that the transmittance becomes 15% or less in the near-infrared region of about 794 to 1150 nm and the near-ultraviolet region of about 350 to 382 nm, thereby exhibits the average transmittance of 98% or more in the visible region of about 400 to 700 nm.

When the first reflection layer (UA1) and the second reflection layer (A2) are continuously provided on the same principal surface of the transparent substrate, the dielectric multilayered film can be continuously formed, which improves productivity. However, as described above, if the dielectric film with high packing density and high reliability is tried to be formed in the present filter, the transparent substrate is easily strained in accordance with a film stress, so that it is sometimes required to produce the filter under film formation conditions for reducing the film stress. Further, in the present filter, as the number of layers of the dielectric film increases, interference ripples are easily generated, so that it is sometimes required to design a multi-layered film suppressing the generation of ripples, and to control the film thickness with high precision for reproducing the design.

On the other hand, when the first reflection layer (UA1) and the second reflection layer (A2) are provided, in a separate manner, on both principal surfaces of the transparent substrate, the film formation is performed, in two times separately, on the front surface and the rear surface, which may decrease the productivity. However, when the first reflection layer (UA1) and the second reflection layer (A2) are formed through the same manufacturing method by using the same dielectric material, stresses of the respective dielectric multilayered films have the same level, so that film stresses on both surfaces of the transparent substrate act so as to cancel each other, resulting in that it is easy to suppress the strain even if the high-refractive index dielectric film with high packing density is included. Further, the dielectric film with high packing density has a small change in optical characteristics in accordance with environmental changes, so that it easily obtains high reliability. Further, if a transparent substrate which is thicker than the coherence length of the incident lights is used, the interference ripples between the first reflection layer (UA1) and the second reflection layer (A2) are difficult to be generated. As a result of this, it is possible to determine the spectral transmittances of the first reflection layer (UA1) and the second reflection layer (A2) through calculation in which the interference between the two dielectric multilayered films is ignored and only multiple reflections are taken into consideration, without adjusting the designs of the individual dielectric multilayered films.

The above indicates the configuration examples of the aforementioned optical filter (reflection-type filter), and the calculation examples of the spectral transmittances in the dielectric multilayered films of the reflection layer of the optical filter in which the obliquely incident light at the incident angle θ of 0° to 30° is assumed. When the range of the incident angle θ is different, the multilayered film configuration in which the change in the spectral transmittance in accordance with the range of the incident angle is taken into consideration, may be employed.

<Transparent Substrate>

When the transparent substrate is used in the optical filter, a composing material of the transparent substrate is not particularly limited as long as it transmits visible light at about 400 to 700 nm. The transparent substrate may employ a base material which absorbs light in the near-infrared region and the near-ultraviolet region. For example, there can be cited an inorganic material such as a glass or crystal, and an organic material such as a resin. Further, although depending on a composing material, a thickness of the transparent substrate is preferably 0.03 to 5 mm, and more preferably 0.03 to 0.5 mm, in terms of reduction in thickness. Further, the transparent substrate is preferably formed of the inorganic material, from a viewpoint of an optical characteristic as an optical filter, stability in shape relating to long term reliability of mechanical characteristics, or the like, a handling ability at a time of manufacturing filters, and so on. The glass with a plate thickness of 0.05 to 0.5 mm is preferable, from a viewpoint of workability.

As the resin capable of being used for the transparent substrate, there can be cited a polyester resin such as polyethyleneterephthalate and polybutyleneterephthalate, a polyolefin resin such as polyethylene, polypropylene, and an ethylene-vinyl acetate copolymer, a norbornene resin, an acrylic resin such as polyacrylate, and polymethylmethacrylate, an urethane resin, a vinyl chloride resin, a fluorocarbon resin, a polycarbonate resin, a polyvinylbutyral resin, a polyvinylalcohol resin, a polyimide resin, and the like.

As the glass capable of being used for the transparent substrate, there can be cited an absorption-type glass in which CuO or the like is added to a fluorophosphate-based glass, a phosphate-based glass, or the like, a soda lime glass, a borosilicate glass, a non-alkaline glass, a quartz glass, and the like. Note that "phosphate-based glass" includes a silicophosphate glass in which part of the skeleton of the glass is constituted of $SiO_2$. Further, as the crystalline material capable of being used for the transparent substrate, there can be cited a birefringent crystal such as crystalline quartz, lithium niobate, and sapphire.

When the absorption-type glass in which CuO or the like is added to the fluorophosphate-based glass, the phosphate-based glass, or the like, is used as the transparent substrate, by adjusting the addition concentration of CuO or the like, or the substrate thickness, it is possible to set a transmittance of the absorption-type glass to 20% or less in the near-infrared region of 700 to 1150 nm. For this reason, it is possible to improve the light blocking property with respect to the near-infrared light which cannot be sufficiently cut-off by the absorption layer containing the first NIR absorbent (DA) or the second NIR absorbent (DB). Further, since it is possible to mitigate the reflectivity (namely, it is possible to reduce the reflectivity) in the near-infrared region, which is required with respect to the reflection layer formed of the dielectric multilayered film, it is possible to obtain the optical filter having the similar light blocking property with the small number of layers. Alternatively, when the reflection layer formed of the dielectric multilayered films with the same configuration is used, the light blocking property is improved, so that an image quality of the imaging device on which the optical filter is mounted, can be improved.

Note that when each of the optical filter 40 to be one example of the present filter, and optical filters 60, 70 to be described later uses the glass or the absorption-type glass as the transparent substrate 13, a not-illustrated dielectric layer may also be provided between the glass or the absorption-type glass (the transparent substrate 13) and the absorption layer 11. The dielectric layer is a layer made of a dielectric material, and a thickness thereof is preferably 30 nm or more. When the dielectric layer is provided, it is possible to improve durability of the absorption layer 11 in the present filter. The thickness of the dielectric layer is more preferably 100 nm or more, and still more preferably 200 nm or more. Although there is no particular upper limit regarding the thickness of the dielectric layer, the thickness is preferably 2000 nm or less, and more preferably 1000 nm or less, from a viewpoint of easiness of design and easiness of manufacture.

The dielectric layer functions as an alkali barrier film to realize improvement of durability of the present filter when, for example, the transparent substrate made of glass contains alkali atoms such as Na atoms or K atoms, and the alkali atoms are dispersed in the absorption layer 11, which may deteriorate the optical characteristics and weather resistance of the absorption layer 11. In the above-described case, it is suitable to employ $SiO_2$, $SiO_x$, $Al_2O_3$, or the like, as the material of the dielectric layer.

Further, each of the optical filter 40 to be the one example of the present filter, and the optical filters 60, 70 to be described later may also include an adhesive film between the transparent substrate 13 and the absorption layer 11. As the adhesive film, it is possible to select a film containing at least one material selected from $MgF_2$, $CaF_2$, $LaF_3$, $NdF_3$, $CeF_3$, $Na_5Al_3F_{14}$, $Na_3AlF_6$, $AlF_3$, $BaF_2$, and $YF_3$. As described above, it is possible to provide, at a position between the transparent substrate 13 and the absorption layer 11, the above-described dielectric layer (alkali barrier film) or the adhesive film, or both of the dielectric layer and the adhesive film.

Here, the glass containing CuO used as the transparent substrate, can employ one described in WO 2014/30628A1, for example.

The transparent substrate preferably has the aforementioned optical characteristics as the optical filter obtained by stacking layers in the order of the absorption layer, the reflection layer, and the like.

<Anti-Reflection Layer>

The anti-reflection layer preferably has a configuration such that, when it is formed on a surface of the absorption layer, it is possible to obtain a function of reducing the Fresnel reflection loss of about 4% generated in accordance with the refractive index difference at the interface between the air and the absorption layer, to the reflectivity of about 1.5% or less, with respect to the incident light at the incident angle of 0° to 30° in the entire visible region of about 400 to 700 nm. Further, the anti-reflection layer is preferably provided between the transparent substrate and the air, when in the configuration of the optical filter in which one surface of the transparent substrate is brought into contact with the air, and generally, the anti-reflection layer uses a dielectric material which is transparent in the visible region, similar to the reflection layer, and utilizes optical interference of thin films, to thereby obtain the anti-reflection effect. In particular, in order to obtain the effective anti-reflection effect in the entire visible region of about 400 to 700 nm, 3 to 9 layers of dielectric films each having a different refractive index may be stacked so that a total film thickness becomes about 200 to 400 nm, for example. When the anti-reflection layer formed of the dielectric multilayered film is directly formed on the surface of the absorption layer, it is preferable to employ a film formation condition realizing a low film stress, and a design of reducing the total film thickness, in order to suppress deterioration of the transparent resin of the absorption layer.

Further, as the anti-reflection layer, it is also possible to use one made by forming an anti-reflection structure called as a moth-eye structure on the surface of the absorption layer. In the moth-eye structure, a conical structure or a pyramid structure is formed on the surface of the absorption layer in a period shorter than that of the visible wavelength which is prevented from being reflected, so that the refractive index moderately changes from the air interface toward the inside of the absorption layer, for example. Note that if the refractive index at the wavelength of 589 nm of the transparent resin which forms the absorption layer is 1.4 to 1.6, it is possible to manufacture the anti-reflection layer configured by the moth-eye structure, by using a mold for molding such as a glass molding mold or a resin molding mold whose surface is previously worked with the moth-eye structure for transfer, and molding and solidifying the surface of the absorption layer, to thereby create a conical or pyramid structure in a period of about 100 to 200 nm and with a height of about 200 to 400 nm. Further, when the transparent resin material forming the absorption layer has a mold release property and the like and thus is not suitable for the molding using a mold for micro molding, it is also possible to deposit transparent resin materials with different characteristics on the absorption layer, to thereby form the moth-eye structure on the resin film. By forming such a resin film, there is also provided an effect of enabling the improvement of durability. When compared with the anti-reflection film utilizing the optical interference of thin films, the moth-eye structure does not require a vacuum process, so that the productivity can be improved, and further, the influence of the film stress can be reduced.

Further, it is also possible to form the anti-reflection layer as a dielectric film of $SiO_2$ or $MgF_2$ with the refractive index n of 1.2 to 1.3, as a result of further reducing the refractive index through a film formation method such as a sol-gel method capable of forming a coarse structure by nano-sized fine particles. In this case, the anti-reflection layer can set, by a single layer, the residual reflection in the visible region (about 400 to 700 nm) to 1% or less with respect to the transparent resin having the refractive index of 1.4 to 1.6. Here, if the optical thickness of the low-refractive index film is set to 127 nm, being ¼ of a center wavelength 509 nm (=2×400×700/(400+700)) in the visible region, the anti-reflection layer has the minimum reflectivity at the wavelength of 509 nm. Further, as the refractive index of the low-refractive index film is closer to a square root of the refractive index of the transparent resin, the minimum reflectivity becomes close to zero.

In the optical filter of the present embodiment, the spectral transmittance curve in the wavelength of 600 to 700 nm in the visible region, can be approximated to a relative visibility spectral curve of eyes of human being, with the help of the spectral transmittance of the light absorption layer containing the first NIR absorbent (DA). Further, even if the spectral transmittance curve in the reflection layer shifts to the shorter wavelength side by depending on the incident angles and the incident polarizations, the present filter acts so as to maintain the spectral transmittance curve in the wavelength of 600 to 700 nm in the absorption layer, so that the light in the near-infrared region can be cut-off by the absorption layer and the reflection layer without being greatly influenced by the incident angles and the incident polarizations.

The present filter gives four kinds of conditions from the relationship between when the incident angle θ=0° and for the s polarization and the p polarization when the incident angle θ=30°, regarding the wavelength at which the transmittance becomes 50% in the near-infrared region. At this time, in the wavelength of 620 to 670 nm, a difference between a wavelength Sh (T50%) under the condition where the wavelength becomes the shortest, and a wavelength Lo (T50%) under the condition where the wavelength becomes the longest, is preferably 2 nm or less, more preferably 1 nm or less, furthermore preferably 0.5 nm or less, and most preferably about 0 nm. Further, in the present filter, each of average values ΔTp ($Avr_{680-750}$) and ΔTs ($Avr_{680-750}$) of transmittance differences between when the incident angle θ=0° and for the respective polarizations (s, p) when the incident angle θ=30° in a wavelength of 680 to 750 nm, is preferably 1.3% or less, more preferably 1.1% or less, furthermore preferably 1.0% or less, and still more preferably 0.9% or less. Note that each of the average values of the transmittance differences in the respective polarizations (s, p) described above can be calculated by averaging differences (8 points in total) between when θ=0° and when θ=30° in the respective polarizations for each 10 nm in the range of 680 to 750 nm, for example.

Further, in the present filter, each of average values ΔTp ($Avr_{1000-1150}$) and ΔTs ($Avr_{1000-1150}$) of transmittance differences between when the incident angle θ=0° and for the respective polarizations (s, p) when the incident angle θ=30° in a wavelength of 1000 to 1150 nm, is preferably 10% or less, more preferably 5% or less, furthermore preferably 2.0% or less, still more preferably 1.5% or less, yet still more preferably 1.0% or less, and most preferably 0.7% or less. Note that each of the average values of the transmittance differences in the respective polarizations (s, p) described above can be calculated by averaging differences (16 points in total) between when θ=0° and when θ=30° in the respective polarizations for each 10 nm in the range of 1000 to 1150 nm, for example. The present indices (ΔTp ($Avr_{1000-1150}$) and ΔTs ($Avr_{1000-1150}$)) can also be applied to an optical filter of a second embodiment to be described later.

Further, when the absorption layer contains the UV absorbent (DU), there is provided a near-ultraviolet absorption band in which the transmittance with respect to incident light in a wavelength of 300 to 420 nm at the incident angle 0° becomes 50% or less. Here, if the wavelength λLo (U1_T50%) at which the transmittance becomes 50% on the longer wavelength side in the near-ultraviolet absorption band with respect to the incident angle 0° in the reflection layer, is provided on the shorter wavelength side of the wavelength λLo (DU_T50%) of the UV absorbent (DU), the spectral transmittance curve in the visible region of about 400 to 440 nm can be approximated to a blue color-matching function spectral curve of eyes of human being, with the help of the spectral transmittance curve of the absorption layer containing the UV absorbent (DU). As described above, even if the spectral transmittance in the reflection layer with respect to the obliquely incident light shifts to the shorter wavelength side by depending on the incident angles and the incident polarizations, the present filter acts so as to maintain the spectral transmittance curve in the absorption layer. Accordingly, even if the light in the near-ultraviolet region is not sufficiently cut-off by the absorption layer, the present filter can cut-off the light by using the reflection layer, without being greatly influenced by the incident angles and the incident polarizations.

Further, a case where the absorption layer has a wavelength λSh (DU_T50%) at which the transmittance becomes 50% on the shorter wavelength side of the wavelength λ (DU_$T_{min}$), and the incident angle θ is changed from 0° to 30°, is considered. At this time, when the reflection layer sets the longest wavelength λSh (U1_T50%) at which the transmittance becomes 50% on the shorter wavelength side in the near-ultraviolet reflection band to 350 nm or less, even if the spectral transmittance of the reflection layer shifts to the shorter wavelength side by depending on the incident angles and the incident polarizations, the light in the near-ultraviolet region of 350 nm or more can be cut-off by the absorption layer and the reflection layer without greatly depending on the incident angles and the incident polarizations.

Second Embodiment

An optical filter of the present embodiment (which is also referred to as "present filter" in the description of the second embodiment, hereinafter) includes an absorption layer, and a reflection layer formed of a dielectric multilayered film.

Figure 8A:
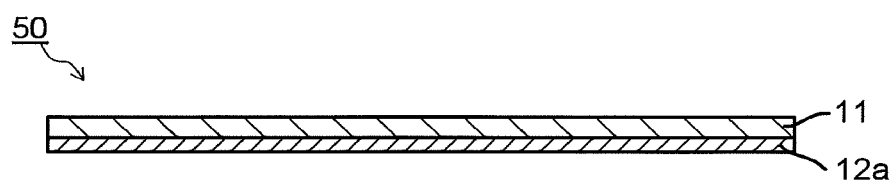
FIG. 8A is a sectional view illustrating one example of an optical filter of a second embodiment.
Figure 8B:
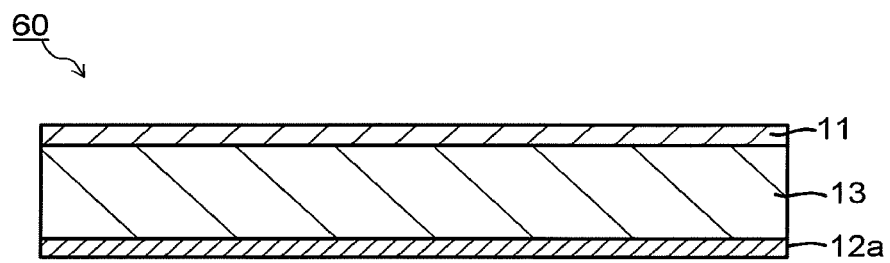
FIG. 8B is a sectional view illustrating another example of the optical filter of the second embodiment.
Figure 8C:
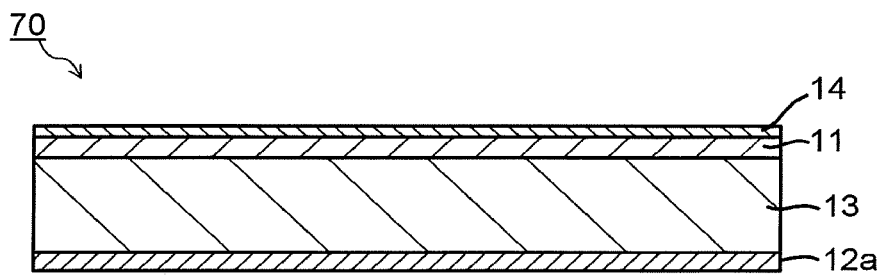
FIG. 8C is a sectional view illustrating still another example of the optical filter of the second embodiment.

FIG. 8A to FIG. 8C illustrate configuration examples of the present filter, but, the configuration of the present filter is not limited to these examples.

FIG. 8A illustrates a configuration example in which the first reflection layer 12a is provided on one principal surface of the absorption layer 11. FIG. 8B illustrates a configuration example in which the absorption layer 11 is provided on one principal surface of the transparent substrate 13, and the first reflection layer 12a is provided on the other principal surface of the transparent substrate 13. FIG. 8C illustrates a configuration example in which the first reflection layer 12a is provided on one principal surface of the transparent substrate 13, and the absorption layer 11 and the antireflection layer 14 are provided on the other principal surface of the transparent substrate 13. Note that in the present embodiment, explanation regarding a point common to that of the first embodiment will be omitted, and explanation will be made regarding mainly a point of difference, in order to avoid overlapped explanation.

(Absorption Layer)

The absorption layer is a layer containing the first NIR absorbent (DA) used in the first embodiment, the second NIR absorbent (DB), and the transparent resin (B), and is typically a layer formed by uniformly dissolving or dispersing the first NIR absorbent (DA) and the second NIR absorbent (DB) in the transparent resin (B). The absorption layer may further contain the UV absorbent (DU) used in the first embodiment. In a similar manner to the first embodiment, the first NIR absorbent (DA) has the maximum absorption wavelength λ (DA_$T_{min}$) in the wavelength of 660 to 785 nm in the absorption spectrum of 350 to 1200 nm of the resin film produced by dissolving or dispersing the NIR absorbent in the transparent resin (B). The second NIR absorbent (DB) has a maximum absorption wavelength λ (DB_$T_{min}$) in a wavelength of 800 to 920 nm in the above-described absorption spectrum. In a similar manner to the first embodiment, the UV absorbent (DU) has the maximum absorption wavelength λ (DU_$T_{min}$) in the wavelength of 370 to 405 nm in the above-described absorption spectrum.

Further, the absorption layer has the wavelength λSh (DA_T50%) at which the transmittance becomes 50% in the wavelength of 620 to 670 nm, on the shorter wavelength side of the maximum absorption wavelength λ (DA_$T_{min}$) of the first NIR absorbent (DA). Further, the absorption layer has a wavelength λLo (DB_T50%) at which the transmittance becomes 50% in a wavelength of 900 to 970 nm, on the longer wavelength side of the maximum absorption wavelength λ (DB_$T_{min}$) of the second NIR absorbent (DB), and sets the concentration of each of the first NIR absorbent (DA) and the second NIR absorbent (DB) and the thickness d so that a relation of λSh (DA_T50%)<λ (DA_$T_{min}$)<λ (DB_$T_{min}$)<λLo (DB_T50%) is satisfied. Further, when the absorption layer contains the UV absorbent (DU), the absorption layer sets the concentration of the UV absorbent (DU) and the thickness d, so that there is provided a wavelength λLo (DU_T50%) at which the transmittance becomes 50% in the wavelength of 400 to 420 nm, on the longer wavelength side of the maximum absorption wavelength λ (DU_$T_{min}$) of the UV absorbent (DU).

The absorption layer of the present filter preferably satisfies the following relation between the near-infrared absorption band in which the transmittance of the transparent resin containing the first NIR absorbent (DA) becomes 50% or less (from the wavelength λSh (DA_T50%) to the wavelength λLo (DA_T50%)) and the near-infrared absorption band in which the transmittance of the transparent resin containing the second NIR absorbent (DB) becomes 50% or less (from a wavelength λSh (DB_T50%) to the wavelength λLo (DB_T50%)).

$$\lambda Sh(DA\_T50\%) < \lambda Sh(DB\_T50\%) \le \lambda Lo(DA\_T50\%) < \lambda Lo(DB\_T50\%)$$

When the above-described relation is satisfied, it is possible to set the transmittance of the absorption layer to 25% or less, in a boundary region between the absorption band of the first NIR absorbent (DA) and the absorption band of the second NIR absorbent (DB). Further, it is more preferable that the absorption layer of the present filter satisfies the following relation between the near-infrared absorption band in which the transmittance of the transparent resin containing the first NIR absorbent (DA) becomes 15% or less (from the wavelength λSh (DA_T15%) to the wavelength λLo (DA_T15%)) and the near-infrared absorption band in which the transmittance of the transparent resin containing the second NIR absorbent (DB) becomes 15% or less (from a wavelength λSh (DB_T15%) to a wavelength λLo (DB_T15%)).

$$\lambda Sh(DB\_T15\%) \le \lambda Lo(DA\_T15\%)$$

When the above-described relation is satisfied, it is possible to set the transmittance of the absorption layer to 3% or less, in a boundary region between the absorption band of the first NIR absorbent (DA) and the absorption band of the second NIR absorbent (DB). As the second NIR absorbent (DB), one having a maximum absorption in the wavelength of 800 to 920 nm in the aforementioned absorption spectrum can be used, for example. As concrete examples thereof, there can be cited 04, 79, and the like in IRD series manufactured by KODAK, 5547, 5588, and the like in Epolight™ series manufactured by Epolin, Inc., 907B, 910C, and the like in NIR series manufactured by QCR Solutions Corp., SDA8630 and the like manufactured by H.W. Sands Corp. NP800, IRA868, and the like manufactured by Exciton, Inc. (all of the above are product names).

Figure 9:
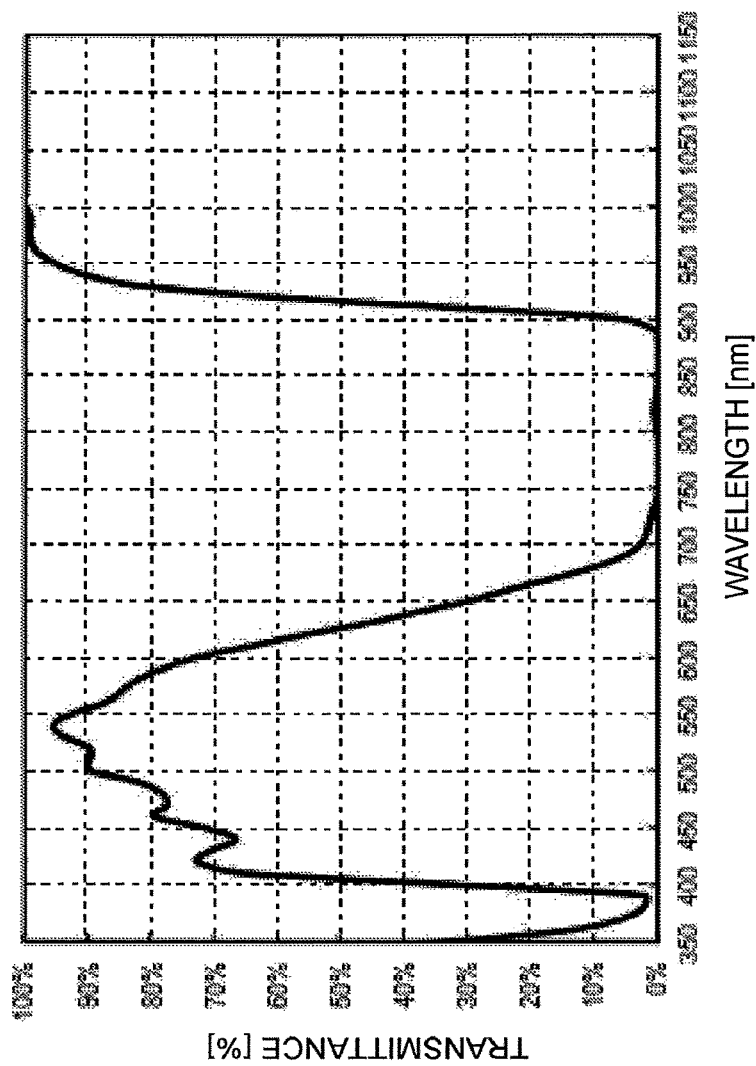
FIG. 9 is a graph illustrating a calculation result of a spectral transmittance of an absorption layer containing a UV absorbent (DU), a first NIR absorbent (DA), and a second NIR absorbent (DB).

For example, when the absorption layer contains NIR775B having the maximum absorption wavelength λ (DA_$T_{min}$) of 775 nm as the first NIR absorbent (DA), and Epolight™5588 having the maximum absorption wavelength λ (DB_$T_{min}$) of 860 nm as the second NIR absorbent (DB), the near-infrared region in which the light can be cut-off by the absorption to realize the transmittance of up to 2% or less, can be widened to about 700 to 900 nm. FIG. 9 illustrates an example of a spectral transmittance curve of the absorption layer as described above to which the aforementioned SDA3382 is further added as the UV absorbent (DU). The spectral transmittance curve was calculated by adjusting the concentrations of the respective NIR absorbents and the UV absorbent in the absorption layer and the thickness d. In FIG. 9, the Fresnel reflection loss of about 4% which is generated at one interface between the absorption layer and the air is not taken into consideration, and the spectral transmittance corresponds to an internal transmittance of the absorption layer. FIG. 9 illustrates a spectral transmittance curve in a case where a predetermined antireflection layer is provided on the interface of the absorption layer.

As illustrated in FIG. 9, the absorption layer in the above-described example exhibits spectral transmittances such that a transmittance in the near-ultraviolet region of 363 to 393 nm is 10% or less, a transmittance in the visible region of 404 nm and 625 nm is about 50%, an average transmittance in the wavelength of 410 to 630 nm is about 77%, and a transmittance in the near-infrared region of 690 to 900 nm is about 5% or less.

The spectral transmittance curve of the absorption layer illustrated in FIG. 9 does not have the incident angle dependence of incident light almost at all. Therefore, by including the above-described absorption layer, it is possible to obtain a stabilized spectral transmittance curve, with respect to divergent and focused incident lights as well, in a boundary region between the visible region and the near-ultraviolet region, and a boundary region between the visible region and the near-infrared region.

Note that regarding each of the first NIR absorbent (DA) and the second NIR absorbent (DB), one kind of NIR absorbent may be used solely, or two or more kinds of the absorbents may be mixed and used. Further, also when the UV absorbent (UV) is used, one kind of UV absorbent may be used solely, or two or more kinds of the absorbents may be mixed and used. However, when the absorption layer uses a plurality of types of absorbents in a combined manner, and if there is a residual absorption peculiar to the absorbents in the visible region, the transmittance in the visible region is lowered, so that the absorbent is preferably selected by taking the influence on the visible region into consideration, and further, it is preferable that the concentration and the thickness are also taken into consideration. A ratio of the total amount of the NIR absorbent (DA) and the NIR absorbent (DB) with respect to the total amount of the absorbents in the absorption layer is preferably 3 to 100 mass %. Further, it is preferable that the total amount of the NIR absorbent (DA) and the NIR absorbent (DB) with respect to 100 parts by mass of the transparent resin (B) is preferably 0.01 to 20 parts by mass, more preferably 0.05 to 15 parts by mass, and still more preferably 1 to 10 parts by mass.

The absorption layer of the optical filter of the present embodiment contains the first NIR absorbent (DA) having the maximum absorption wavelength λ (DA_$T_{min}$) in the wavelength of 660 to 785 nm, and the second NIR absorbent (DB) having the maximum absorption wavelength λ (DB_$T_{min}$) in the wavelength of 800 to 920 nm, in the above-described absorption spectrum. By designing as above, the absorption layer can widen the near-infrared absorption band to 700 to 900 nm, resulting in that the optical filter of the present embodiment can cut-off light in the near-infrared region of 700 to 1150 nm only by one layer of reflection layer (the first reflection layer (UA1)), as will be described later. Further, when the absorption layer further contains the UV absorbent (UV), it can further absorb light in the near-ultraviolet region of 350 to 400 nm. As described above, since it is not essential for the reflection layer of the optical filter of the present embodiment to include the second reflection layer (A2), effects of reduction in thickness of film, improvement of productivity, and stress relief can be expected.

(Reflection Layer)

As described above, the absorption layer of the optical filter of the present embodiment can widen the near-infrared absorption band to about 700 to 900 nm. For this reason, the present filter can be configured to include the first reflection layer (UA1) (only the first reflection layer (UA1)), as the reflection layer, having the near-infrared reflection band in which the transmittance with respect to the incident light at the incident angle of 0° in the wavelength of 670 to 1150 nm becomes 50% or less. The first reflection layer (UA1) makes the cut-off through the absorption in the absorption layer and the cut-off through the reflection in the reflection layer effectively function in the boundary wavelength regions of the respective layers. For this reason, the first reflection layer (UA1) is designed by taking the shift to the shorter wavelength side of the spectral transmittance curve due to the incident angle dependence and the incident polarization dependence into consideration, in a similar manner to the first embodiment.

Specifically, in the first reflection layer (UA1), the longest wavelength having the transmittance of 50% on the shorter wavelength side in the near-infrared reflection band with respect to the incident light at the incident angle θ=0° to 30°, corresponds to the wavelength λSh (A1_T50%) at the incident angle θ=0°. For this reason, the first reflection layer (UA1) designs the dielectric multilayered film so that the wavelength λLo (DB_T50%) at which the transmittance becomes 50% on the longer wavelength side of the maximum absorption wavelength λ (DB_$T_{min}$) of the second NIR absorbent (DB) is positioned on the longer wavelength side of the wavelength λSh (A1_T50%), and the wavelength λSh (A1_T50%) is positioned on the longer wavelength side of the wavelength λ (DB_$T_{min}$). At this time, the wavelength λSh (A1_T50%) of the first reflection layer (UA1) shifts to the shorter wavelength side in accordance with the increase in the incident angle θ, but, since the shifted wavelength falls within the near-infrared absorption band of the absorption layer, it is possible to suppress the change in the spectral transmittance curve of the optical filter.

In this case, in the optical filter of the present embodiment, in order to reduce the transmittance in the wavelength region from the wavelength λ (DB_$T_{min}$) to the wavelength λLo (DB_T50%) in the absorption band of the second NIR absorbent (DB) to 3% or less, the first reflection layer (UA1) is preferably designed so that a wavelength λSh (A1_T15%) at which the transmittance becomes 15% on the shorter wavelength side in the near-infrared reflection band when the incident angle θ=0°, is positioned on the shorter wavelength side of the wavelength λLo (DB_T15%) at which the transmittance becomes 15% on the longer wavelength side in the absorption band of the second NIR absorbent (DB). Further, in the optical filter of the present embodiment, in order to reduce the transmittance in the wavelength region from the wavelength λ (DB_$T_{min}$) to the wavelength λLo (DB_T50%) to 0.3% or less, the first reflection layer (UA1) is preferably designed so that a wavelength λSh (A1_T1%) at which the transmittance becomes 1% on the shorter wavelength side in the near-infrared reflection band when the incident angle θ=0°, is positioned on the shorter wavelength side of the wavelength λLo (DB_T15%) at which the transmittance becomes 15% on the longer wavelength side in the absorption band of the second NIR absorbent (DB).

Further, in a similar manner to the first embodiment, it is preferable to design the first reflection layer (UA1) so that the wavelength λLo (A1_Tp15%) at which the transmittance of light of the p polarization component out of the incident light at the incident angle of 30° becomes 15%, becomes a wavelength longer than the wavelength of 1150 nm, by taking the incident angle dependence and the polarization dependence of the spectral transmittance into consideration also on the longer wavelength side in the near-infrared reflection band. Further, it is more preferable to design the first reflection layer (UA1) so that the wavelength λLo (A1_Tp5%) at which the transmittance of light of the p polarization component out of the incident light at the incident angle θ=30° becomes 5%, becomes a wavelength longer than the wavelength of 1150 nm. By designing as above, regarding the spectral transmittance curve up to the wavelength of 1150 nm, the present filter can suppress the influence of the incident angle dependence and the polarization dependence on the spectral transmittance curve in the first reflection layer (UA1).

The optical filter of the present embodiment can cut-off light in the near-ultraviolet region of 350 to 400 nm and in the near-infrared region of 900 to 1150 nm only by one layer of the reflection layer formed of the dielectric multilayered film, and further, it can cut-off the light without being greatly influenced by the incident angle of light and the incident polarization. For this reason, the effects of reduction in thickness of film, improvement of productivity, stress relief, and the like can be expected.

Further, an absorption wavelength bandwidth in which the transmittance is 50% or less in the first NIR absorbent (DA) having the maximum absorption wavelength of λ (DA_$T_{min}$) is set to Δλ (DA), and an absorption wavelength bandwidth in which the transmittance is 50% or less in the second NIR absorbent (DB) having the maximum absorption wavelength of λ (DB_$T_{min}$) is set to Δλ (DB). At this time, when a wavelength interval between the λ (DB_$T_{min}$) and the λ (DA_$T_{min}$) is greater than an average value of the absorption wavelength bandwidths {Δλ (DA)+Δλ (DB)}/2, transmitted light at a predetermined level or more is generated in a partial region in the wavelength region between the λ (DB_$T_{min}$) and the λ (DA_$T_{min}$), which sometimes becomes a cause of increase in noise or deterioration of color reproducibility. In such a case, the present filter may also employ a configuration of optical filter in which the second reflection layer (A2) is used in combination. In the configuration, since the transmittance in a wavelength of 800 to 900 nm is reduced by the second NIR absorbent (DB), the range of target of the reflectivity of the second reflection layer (A2) with respect to the wavelength region can be reduced (specifically, low reflectivity can also be applied), when compared to the second reflection layer (A2) in the first embodiment. As a result of this, the second reflection layer (A2) in this case can be configured by the dielectric multilayered film whose number of layers and total film thickness are less than those of the second reflection layer (A2) in the first embodiment, so that it is possible to reduce the period of time of film formation, and to reduce the film stress.

Figure 10:
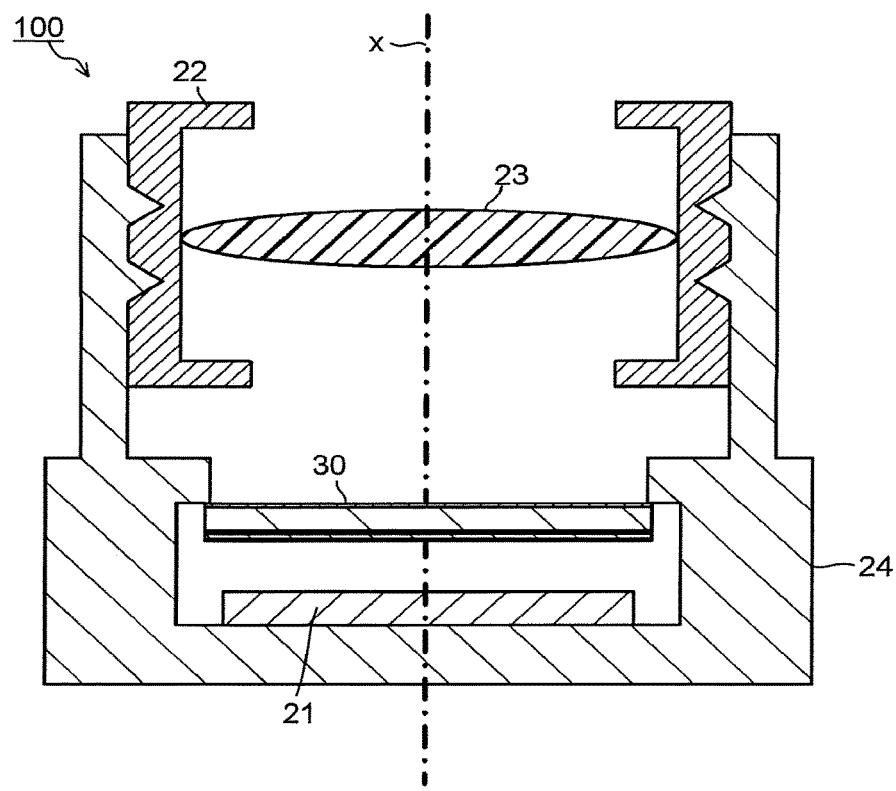
FIG. 10 is a sectional view schematically illustrating one example of an imaging device of the present invention.

Further, the optical filter of each of the embodiments described above is disposed between an imaging lens and a solid-state image sensing device, for example. Further, the optical filter can also be used by being directly adhered to a solid-state image sensing device, an imaging lens, or the like of an imaging device via an adhesive layer. FIG. 10 illustrates one example of an imaging device which uses the optical filter 30 illustrated in FIG. 1C. An imaging device 100 has a solid-state image sensing device 21 with RGB color filters, the optical filter 30 and an imaging lens 23 disposed in front of the solid-state image sensing device 21, and a casing 24 fixing these. The imaging lens 23 is fixed by a lens unit 22 further provided inside the casing 24. The optical filter 30 is disposed so that the first reflection layer (UA1) is positioned on the imaging lens 23 side. The solid-state image sensing device 21 and the imaging lens 23 are disposed along an optical axis X. A direction and a position when the optical filter 30 is installed, are appropriately selected according to design.

EXAMPLES

Hereinafter, the present invention will be described more concretely through examples.

Example 1

Figure 13A:
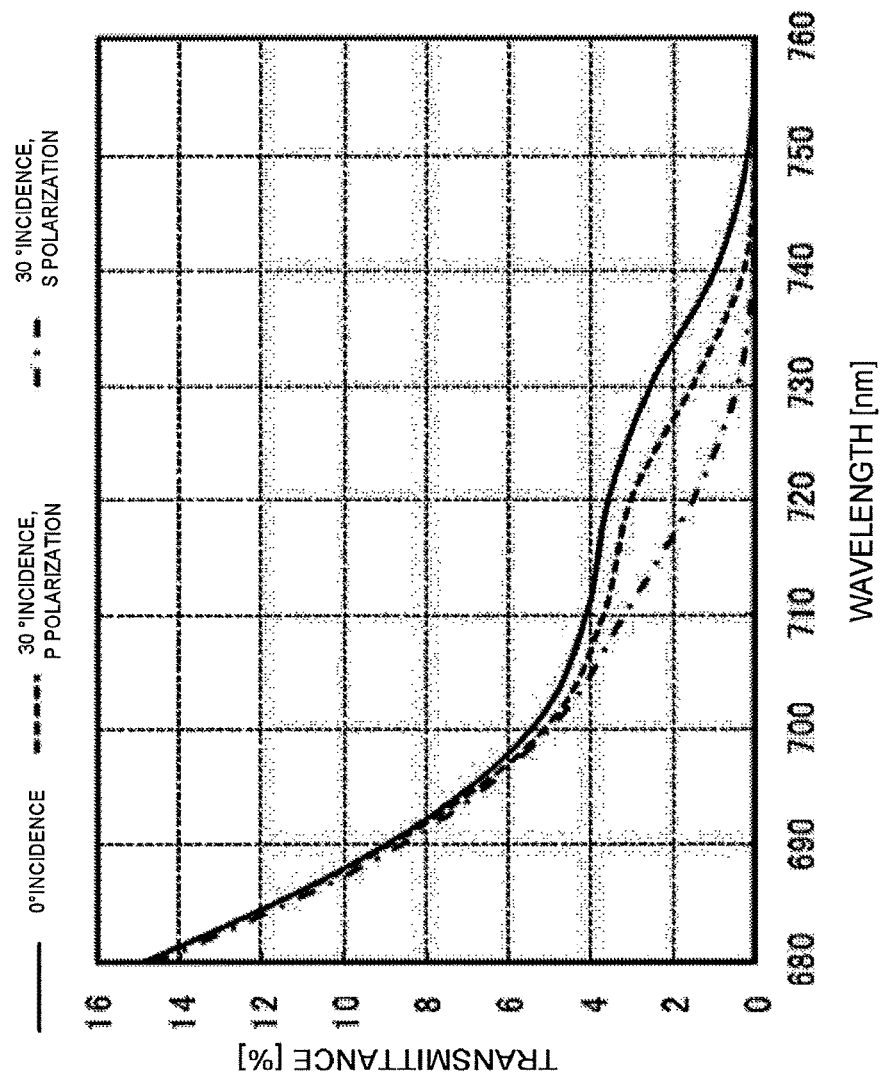
FIG. 13A is a graph illustrating a calculation result of spectral transmittances in a wavelength of 680 to 760 nm of the optical filter of the example 1.
Figure 14A:
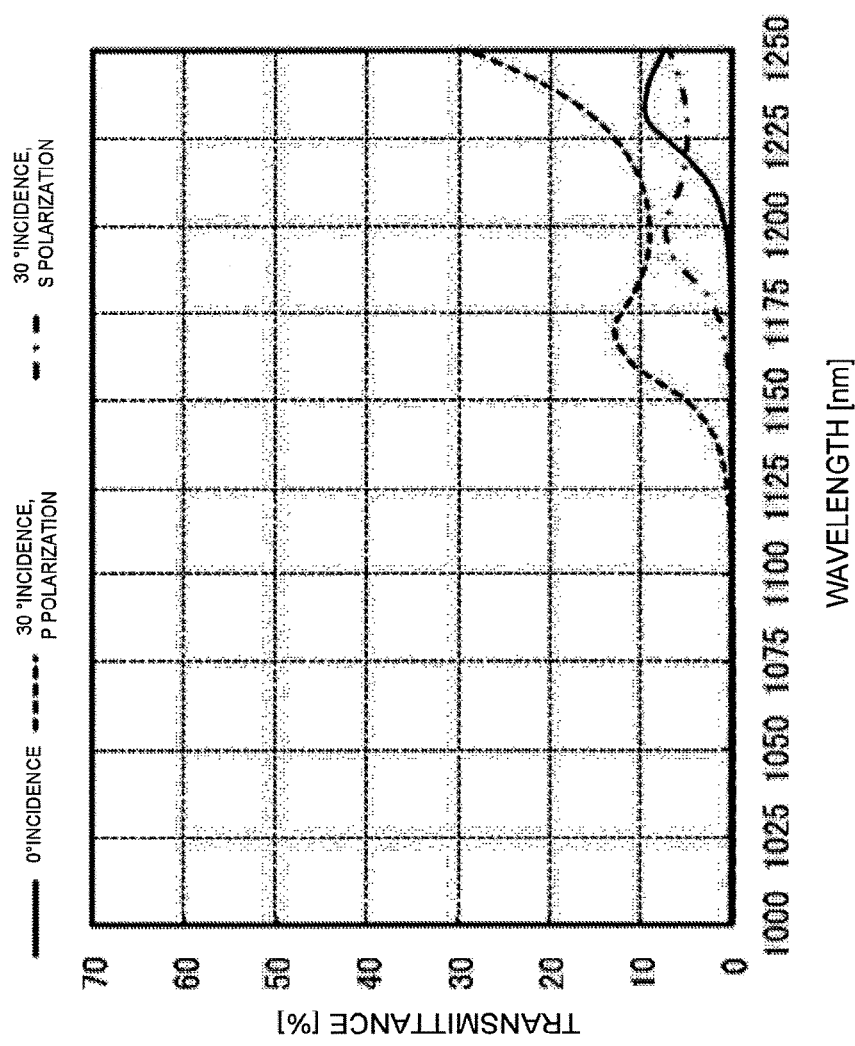
FIG. 14A is a graph illustrating a calculation result of spectral transmittances in a wavelength of 1000 to 1250 nm of the optical filter of the example 1.

The optical filter 30 illustrated in FIG. 1C is manufactured. The first reflection layer 12a formed of the dielectric multilayered film having the configuration represented in Table 2, and the second reflection layer 12b formed of the dielectric multilayered film having the configuration represented in Table 3, are formed so as to sandwich the transparent substrate 13 made of a transparent resin (cycloolefin polymer) film with a refractive index of 1.52 and a thickness of 100 μm. As is apparent from the spectral transmittance curves illustrated in FIG. 5, the second reflection layer 12b has the wavelength λSh (A2_Tp50%) of about 734 nm and the wavelength λSh (A2_Ts50%) of about 720 nm, and therefore, λSh (A2_Tp50%)–λSh (A2_Ts50%) is 14 nm. Next, the absorption layer 11 containing NIR775B as the NIR absorbent (DA) and SDA3382 as the UV absorbent (DU), is formed on a surface of the second reflection layer 12b. Specifically, NIR775B, SDA3382, and a cyclohexanone solution with 15 mass % of acrylic resin having a refractive index of 1.49, are mixed by appropriately performing adjustment in a range in which a total amount of NIR775B and SDA3382 becomes 0.01 to 20 parts by mass with respect to 100 parts by mass of the acrylic resin, and then stirred and dissolved at room temperature, to thereby obtain a coating liquid. The obtained coating liquid is coated through a die coating method on a surface, on which the second reflection layer 12b is formed, of the transparent substrate 13 made of the transparent resin film, and heating and drying are performed at 150° C. for 30 minutes, to thereby form the near-ultraviolet and near-infrared absorption layer 11 with a film thickness of 10 μm. Further, on an interface of the absorption layer 11 with the air, the $Al_2O_3$ film, the $ZrO_2$ film, and the $MgF_2$ film are stacked in order to form the anti-reflection layer 14 formed of three layers, to thereby set the residual reflectivity with respect to the incident light in the visible region of 400 to 700 nm at the incident angle θ=0° to 30°, to 1.5% or less. Consequently, it is possible to obtain the optical filter 30 having spectral transmittance curves illustrated in FIG. 11, FIG. 13A, and FIG. 14A (when the incident angle θ=0° and regarding the p polarization and the s polarization when the incident angle θ=30°). Note that FIG. 11 illustrates the spectral transmittance curve in the wavelength of 350 to 1150 nm, FIG. 13A illustrates the spectral transmittance curve in a wavelength of 680 to 760 nm, and FIG. 14A illustrates the spectral transmittance curve in a wavelength of 1000 to 1250 nm.

Example 2

The optical filter 40 illustrated in FIG. 1D is manufactured. The reflection layer having the configuration of integrating the first reflection layer 12a formed of the dielectric multilayered film having the configuration represented in Table 2, and the second reflection layer 12b formed of the dielectric multilayered film having the configuration represented in Table 3, is formed on one principal surface of the transparent substrate 13 made of a soda lime glass with a thickness of 200 μm. As is apparent from the spectral transmittance curves illustrated in FIG. 7, the reflection layer having the configuration of integrating the first reflection layer 12a and the second reflection layer 12b, has the wavelength λSh (A2_Tp50%) of about 722 nm and the wavelength λSh (A2_Ts50%) of about 712 nm, and therefore, λSh (A2_Tp50%)–λSh (A2_Ts50%) is 10 nm. Next, on the other principal surface of the transparent substrate 13, the absorption layer 11 containing NIR775B as the NIR absorbent (DA) and SDA3382 as the UV absorbent (DU), is formed. Specifically, NIR775B, SDA3382, and a cyclopentanone solution with 10 mass % of polycarbonate resin having a refractive index of 1.59, are mixed by appropriately performing adjustment in a range in which a total amount of NIR775B and SDA3382 becomes 0.01 to 20 parts by mass with respect to 100 parts by mass of the polycarbonate resin, and then stirred and dissolved at room temperature, to thereby obtain a coating liquid. The obtained coating liquid is coated through the die coating method on a surface, on which the reflection layer is not formed, of the transparent substrate 13, and heating and drying are performed at 150° C. for 30 minutes, to thereby form the near-ultraviolet and near-infrared absorption layer 11 with a film thickness of 10 μm. Further, on an interface of the absorption layer 11 with the air, the $TiO_2$ film and the $SiO_2$ film are alternately stacked to form the anti-reflection layer 14 formed of four layers, to thereby set the residual reflectivity with respect to the incident light in the visible region of 400 to 700 nm at the incident angle θ=0° to 30°, to 1.5% or less. Consequently, it is possible to obtain the optical filter 40 having spectral transmittance curves illustrated in FIG. 12 (when the incident angle θ=0° and regarding the p polarization and the s polarization when the incident angle θ=30°).

Figure 11:
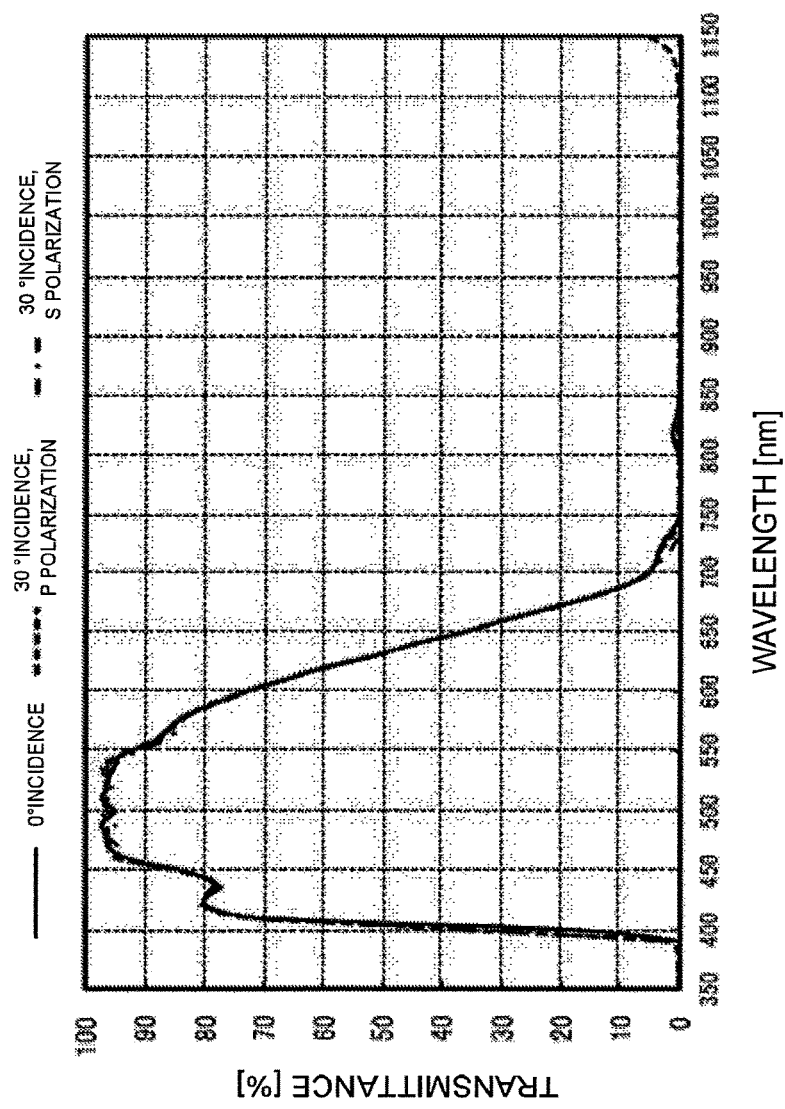
FIG. 11 is a graph illustrating a calculation result of spectral transmittances of an optical filter of an example 1.
Figure 12:
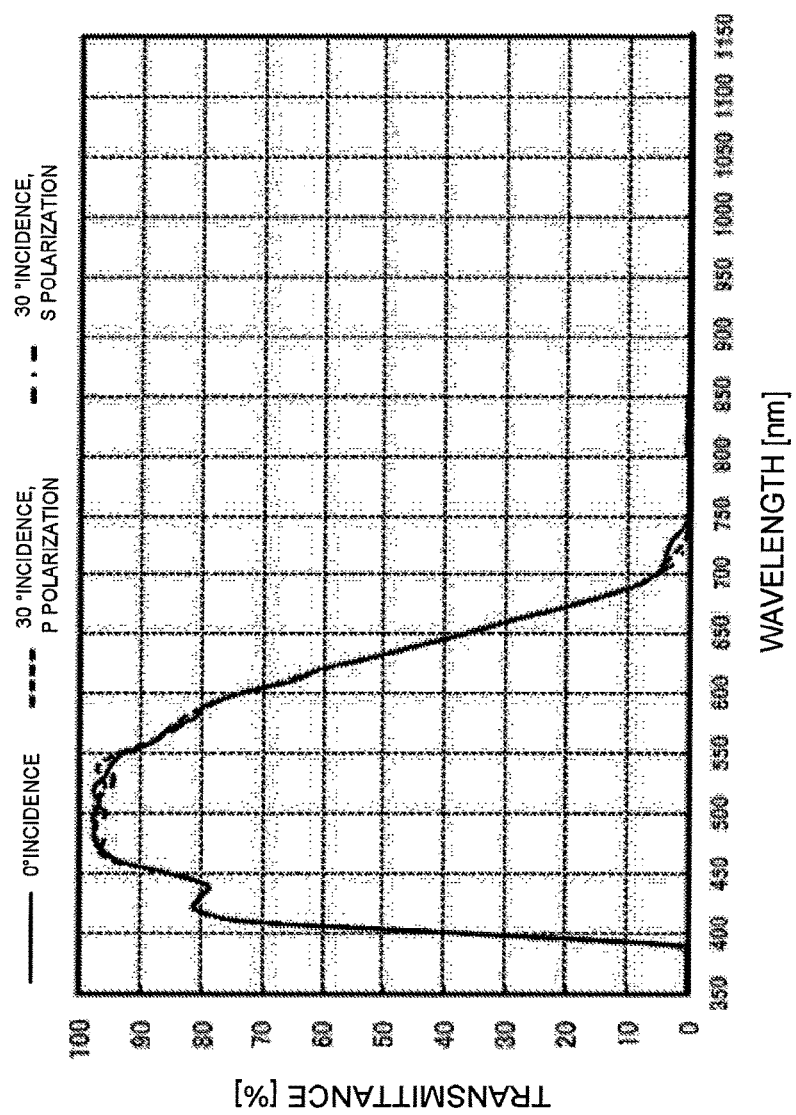
FIG. 12 is a graph illustrating a calculation result of spectral transmittances of an optical filter of an example 2.

As is apparent from FIG. 11 and FIG. 12, each of the optical filter 30 in the example 1 and the optical filter 40 in the example 2 has the following characteristics. Specifically, each of these optical filters cuts-off the incident light at the incident angle of 0° to 30° in the near-ultraviolet region of 350 to 400 nm and the near-infrared region of 700 to 1150 nm, to which eyes of human being do not have sensitivity but a solid-state image sensing device with RGB color filters has sensitivity, exhibits almost no variation in the spectral transmittance at 400 to 450 nm and 600 to 700 nm in the visible region at the incident angle of 0° to 30°, and exhibits a spectral sensitivity curve approximated to the color-matching function corresponding to the relative visibility of eyes of human being, resulting in that a high average transmittance of 89% or more can be obtained in the visible region of 440 to 600 nm. Particularly, in each of these optical filters, even when the incident light is image light biased to the s polarization or the p polarization and is obliquely incident, the spectral transmittance curve changes slightly, and thus stable characteristics can be maintained. In particular, as is apparent from the fact that in FIG. 13A, the shift amount of the s polarization component when the incident angle is changed from 0° to 30° is greatly reduced (the shift amount is about 0 nm at the transmittance of 10%), it is possible to suppress the change in the spectral transmittance curve (transition from transmission to cut-off) which depends on the polarization components on the longer wavelength side in the visible region. Note that in each of the optical filter 30 in the example 1 and the optical filter 40 in the example 2, each of ΔTp ($Avr_{680-750}$) and ΔTs ($Avr_{680-750}$) is 0.9% or less. Further, the first reflection layer 12a generates the reflection bands in the near-ultraviolet region of 350 to 400 nm and in the near-infrared region of 950 to 1150 nm, and can realize high cut-off characteristics such that the minimum transmittance in the reflection band becomes 0.1% or less, with the configuration of the dielectric multilayered film having the small number of layers and the small total film thickness, which is effective for the reduction in thickness of film, the reduction in the multilayered film stress, and the improvement of productivity. Further, in the optical filter 30 in the example 1, the first reflection layer (UA1) 12a is formed on the one principal surface of the transparent resin film substrate 11, and the second reflection layer (A2) 12b is formed on the other principal surface of the substrate. For this reason, even if a highly reliable dielectric film having a high density and a large multilayered film stress is used, the multilayered film stress is easily uniformized on both surfaces of the film, so that it is possible to realize stable optical performance in which an amount of strain of the transparent resin film substrate 11 is small, and a degree of deterioration of transmitted wavefront aberration is small. As a result of this, by using the present filter as the optical filter of the imaging device which uses the solid-state image sensing device with RGB color filters as exemplified in FIG. 10, it is possible to stably obtain an image excellent in color reproducibility.

Comparative Example 1

Figure 13B:
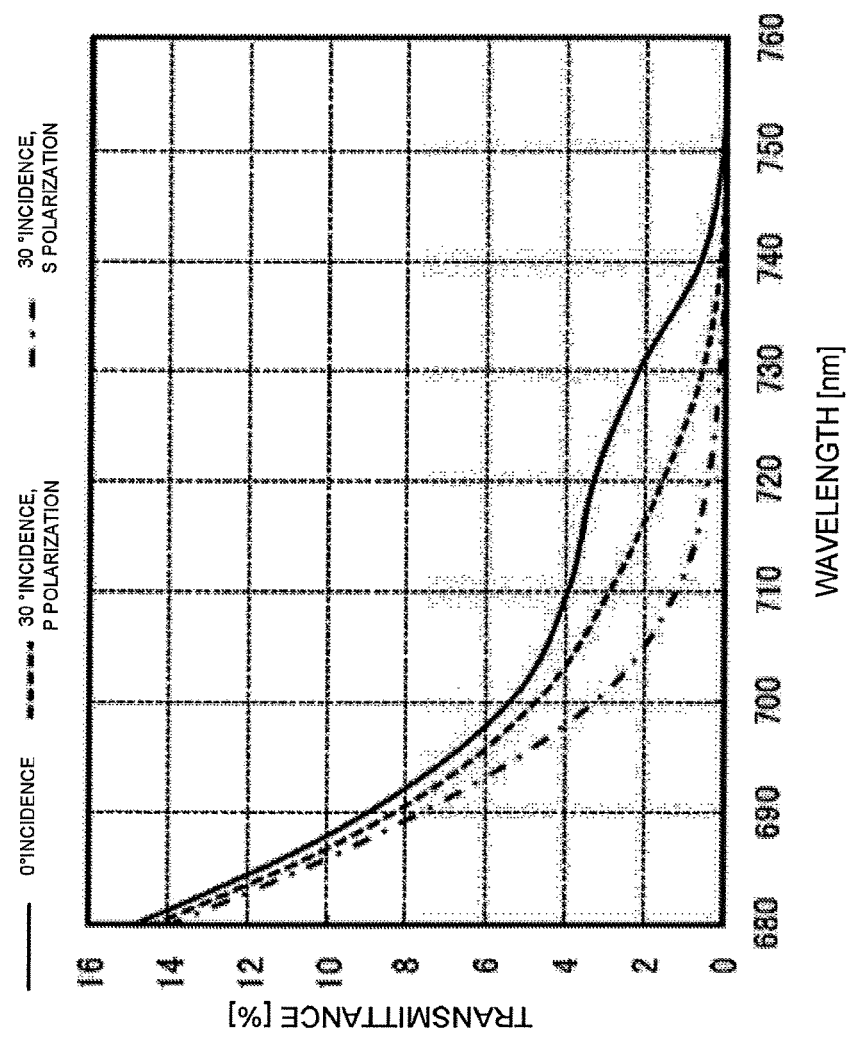
FIG. 13B is a graph illustrating a calculation result of spectral transmittances in the wavelength of 680 to 760 nm of an optical filter of a comparative example 1.

An optical filter is obtained in a manner similar to that of the example 1, except that a reflection layer made of a dielectric multilayered film which is designed and adjusted so that a wavelength having a transmittance of 50% with respect to the p polarization at the incident angle of 30° (corresponding to λSh (A2_Tp50%) of the second reflection layer 12b) becomes about 719 nm, is formed, instead of the second reflection layer 12b of the example 1. FIG. 13B is a graph illustrating a calculation result of spectral transmittance curves at the incident angle of 0° and for each polarization with respect to the incident light at the incident angle of 30° in the wavelength of 680 to 760 nm in this comparative example 1.

As is apparent from comparison between FIG. 13A (example 1) and FIG. 13B (comparative example 1), in the optical filter of the comparative example 1, the variation in the spectral transmittance which depends on the incident angle in a wavelength of 690 to 730 nm increases, when compared to the example 1. Specifically, in the comparative example 1, a calculation result regarding "average value of transmittance differences" obtained by dividing the sum of transmittance differences between when the incident angle is 0° and when the incident angle is 30° for each 10 nm in the wavelength of 680 to 750 nm by 8, being the wavelength number, is $\Delta Tp$ ($Avr_{680-750}$)=0.84% regarding the p polarization, and is $\Delta Ts$ ($Avr_{680-750}$)=1.57% regarding the s polarization. On the other hand, in the example 1, it is possible to obtain $\Delta Tp$ ($Avr_{680-750}$)=0.39%, and $\Delta Ts$ ($Avr_{680-750}$)=0.89% regarding the s polarization, each of which falls within a range of difference (change) of 1.3% or less, regardless of the incident polarizations. As a result of this, if the optical filter of the comparative example 1 is used in the imaging device as exemplified in FIG. 10, a captured image with inferior color reproducibility is obtained.

Comparative Example 2

Figure 14B:
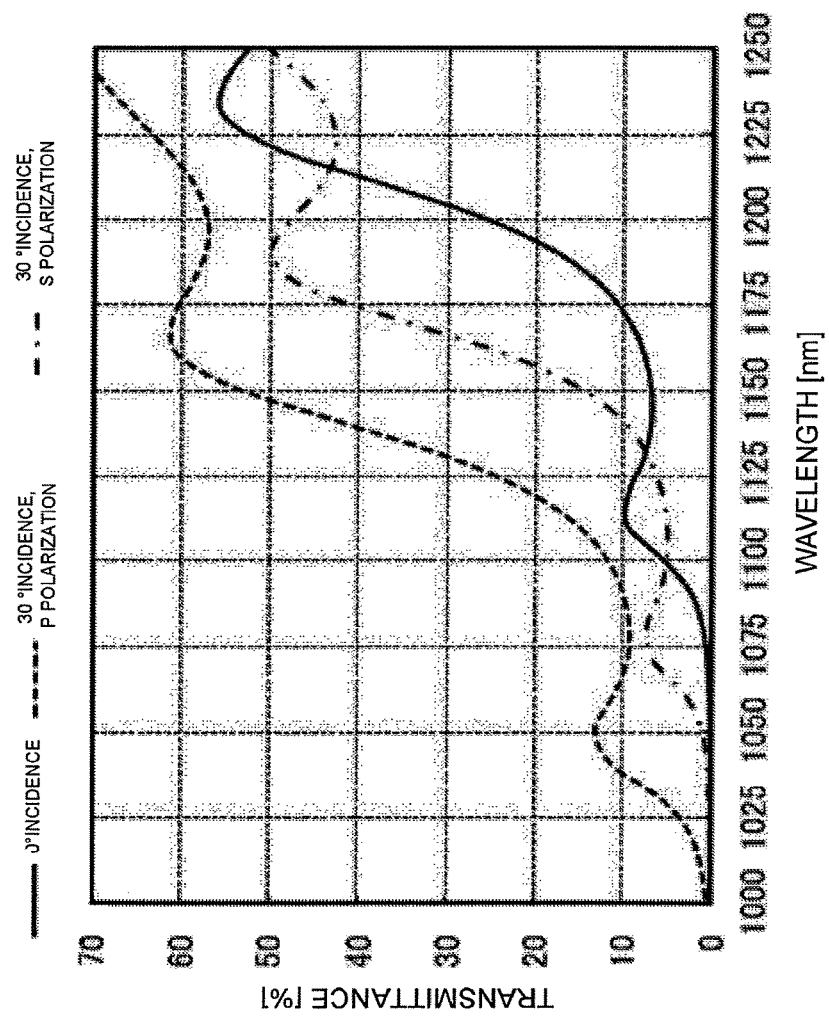
FIG. 14B is a graph illustrating a calculation result of spectral transmittances in the wavelength of 1000 to 1250 nm of an optical filter of a comparative example 2.

An optical filter is obtained in a manner similar to that of the example 1, except that a reflection layer made of a dielectric multilayered film which is designed and adjusted so that a wavelength having a transmittance of 15% with respect to the s polarization at the incident angle of 30° (corresponding to λLo (UA1_Ts15%) of the first reflection layer 12a) becomes about 1150 nm (a wavelength having a transmittance of 15% with respect to the p polarization at the incident angle of 30° (corresponding to λLo (UA1_Tp15%) of the first reflection layer 12a) becomes about 1110 nm, which is on the shorter wavelength side of the wavelength of 1150 nm), is formed, instead of the first reflection layer 12a of the example 1. FIG. 14B is a graph illustrating a calculation result of spectral transmittance curves at the incident angle of 0° and for each polarization with respect to the incident light at the incident angle of 30° in the wavelength of 1000 to 1250 nm in this comparative example 2.

As is apparent from comparison between FIG. 14A (example 1) and FIG. 14B (comparative example 2), in the optical filter of the comparative example 2, the variation in the spectral transmittance which depends on the incident angle in a wavelength of 1040 to 1150 nm to which the solid-state image sensing device with RGB color filters have sensitivity, increases, when compared to the example 1. Specifically, in the comparative example 2, a calculation result regarding "average value of transmittance differences" obtained by dividing the sum of transmittance differences between when the incident angle is 0° and when the incident angle is 30° for each 10 nm in the wavelength of 1000 to 1150 nm by 16, being the wavelength number, is $\Delta Tp$ ($Avr_{1000-1150}$)=12.2% regarding the p polarization, and is $\Delta Ts$ ($Avr_{1000-1150}$)=2.5% regarding the s polarization. On the other hand, in the example 1, it is possible to obtain $\Delta Tp$ ($Avr_{1000-1150}$)=0.6% regarding the p polarization, and $\Delta Ts$ ($Avr_{1000-1150}$)=0.0% regarding the s polarization, each of which falls within a range of difference (change) of 10% or less, regardless of the incident polarizations. Further, average transmittances $TAvr_{1000-1150}$ (0°), $TpAvr_{1000-1150}$ (30°), and $TsAvr_{1000-1150}$ (30°) calculated from spectral transmittance curves at the incident angle of 0° and for the p polarization and the s polarization at the incident angle of 30° in the above-described wavelength region, become $TAvr_{1000-1150}$ (0°)=3.1%, $TpAvr_{1000-1150}$ (30°)=15.3%, and $TsAvr_{1000-1150}$ (30°)=4.4%, in the comparative example 2. On the other hand, in the example 1, there are provided $TAvr_{1000-1150}$ (0°)=0.0%, $TpAvr_{1000-1150}$ (30°)=0.6%, and $TsAvr_{1000-1150}$ (30°)=0.0%, each of which falls within a range of average transmittance of 1.0% or less. As a result of this, if the optical filter of the comparative example 2 is used in the imaging device as exemplified in FIG. 10, a captured image with inferior color reproducibility is obtained.

Example 3

The optical filter 70 illustrated in FIG. 8C is manufactured. The first reflection layer 12a formed of the dielectric multilayered film having the configuration represented in Table 2, is formed on one principal surface of the transparent substrate 13 made of a soda lime glass with a thickness of 200 μm. Next, on the other principal surface of the transparent substrate 13, the absorption layer 11 containing NIR775B as the NIR absorbent (DA), SDA3382 as the UV absorbent (DU), and Epolight5588 as the NIR absorbent (DB), is formed. Specifically, NIR775B, SDA3382, Epolight5588, and a toluene solution with 25 mass % of cycloolefin resin having a refractive index of 1.52, are mixed by appropriately performing adjustment in a range in which a total amount of NIR775B, SDA3382 and Epolight5588 becomes 0.01 to 20 parts by mass with respect to 100 parts by mass of the cycloolefin resin, and then stirred and dissolved at room temperature, to thereby obtain a coating liquid. The obtained coating liquid is coated through the die coating method on a surface, on which the reflection layer is not formed, of the transparent substrate 13, heating is performed at 70° C. for 10 minutes, and then heating is further performed at 110° C. for 10 minutes, to thereby form the near-ultraviolet and near-infrared absorption layer 11 with a film thickness of 22 μm. Further, on an interface of the absorption layer 11 with the air, the $TiO_2$ film and the $SiO_2$ film are alternately stacked to form the anti-reflection layer 14 formed of four layers, to thereby set the residual reflectivity with respect to the incident light in the visible region of 400 to 700 nm at the incident angle θ=0° to 30°, to 1.5% or less. Consequently, it is possible to obtain the optical filter having spectral transmittance curves illustrated in FIG. 15 (when the incident angle θ=0° and regarding the p polarization and the s polarization when the incident angle θ=30°).

As is apparent from FIG. 15, the optical filter 70 in the example 3 has the following characteristics. Specifically, the optical filter 70 cuts-off the incident light at the incident angle of 0° to 30° in the near-ultraviolet region of 350 to 400 nm and the near-infrared region of 700 to 1150 nm, to which eyes of human being do not have sensitivity but a solid-state image sensing device with RGB color filters has sensitivity. Further, the optical filter 70 exhibits almost no variation in the spectral transmittance at 400 to 450 nm and 600 to 700 nm in the visible region at the incident angle θ=0° to 30°, and exhibits a spectral sensitivity curve approximated to the color-matching function corresponding to the relative visibility of eyes of human being, resulting in that a high average transmittance of 82% or more can be obtained in the visible region of 440 to 600 nm. Note that $\Delta Tp$ ($Avr_{680-750}$) and $\Delta Ts$ ($Avr_{680-750}$) are 0.1% and 0.2%, respectively, each of which falls within a range of difference (change) of 1.3% or less, and further, $\Delta Tp$ ($Avr_{1000-1150}$) and $\Delta Ts$ ($Avr_{1000-1150}$) are 0.6% and 0.0%, respectively, each of which falls within a range of difference (change) of 10% or less. Further, there are provided $TAvr_{1000-1150}$ (0°)=0.0%, $TpAvr_{1000-1150}$ (30°)=0.6%, and $TsAvr_{1000-1150}$ (30°)=0.0%, each of which falls within a range of average transmittance of 1.0% or less.

The absorption layer in the example 3 has the near-infrared absorption band of about 690 to 900 nm, which is wider than that of the absorption layer in each of the example 1 and the example 2. For this reason, the optical filter 70 in the example 3 does not require the second reflection layer 12b which reflects light in a wavelength of 800 to 1000 nm, and it is possible to realize the cut-off function with the use of the reflection layer formed only of the first reflection layer 12a which reflects light in the near-ultraviolet region of 350 to 400 nm, and in the near-infrared region of 900 to 1150 nm. Specifically, the optical filter 70 in the example 3 corresponds to an optical filter exhibiting stable spectral transmittance characteristic with respect to the incident light at the incident angle θ=0° to 30° in the wavelength of 350 to 1150 nm, even if it uses the reflection layer formed of the dielectric multilayered film whose total film thickness and number of layers are about half of those of the example 1 and the example 2. Further, in the optical filter in the example 3, even when the incident light is image light biased to the s polarization or the p polarization and is obliquely incident, the spectral transmittance curve changes slightly, and thus stable characteristics can be maintained, in a similar manner to the optical filters in the example 1 and the example 2. As a result of this, by using the present filter as the optical filter of the imaging device as exemplified in FIG. 10, it is possible to stably obtain a captured image excellent in color reproducibility.

The optical filter of the present invention is effective for use as an optical filter used in an imaging device such as a digital still camera, a digital video camera, or a camera of mobile phone, which uses a solid-state image sensing device (CCD, CMOS, or the like).

What is claimed is:

1. An optical filter, comprising: an absorption layer containing a near-infrared absorbent having a maximum absorption in a wavelength of 660 to 785 nm, and satisfying the following requirement (i-1); and a reflection layer formed of a dielectric multilayered film satisfying the following requirement (ii-1),
   (i-1) in a wavelength of 620 to 670 nm, on a shorter wavelength side of a wavelength $\lambda$ (DA_$T_{min}$) exhibiting the maximum absorption, there is a wavelength $\lambda$Sh (DA_T50%) at which a transmittance becomes 50%, and
   (ii-1) in a wavelength of 670 to 1200 nm, there is a near-infrared reflection band in which a transmittance with respect to light at an incident angle of 0° becomes 50% or less, and a wavelength $\lambda$Sh (A2_Ts50%) at which a transmittance of light of an s polarization component out of light at an incident angle of 30° becomes 50%, on a shorter wavelength side of the near-infrared reflection band, is positioned on a longer wavelength side of the wavelength $\lambda$Sh (DA_T50%).

2. The optical filter according to claim 1, wherein the reflection layer satisfies the following requirement (ii-2),
   (ii-2) on a shorter wavelength side of the near-infrared reflection band, a wavelength $\lambda$Sh (A2_Tp50%) at which a transmittance of light of a p polarization component out of light at an incident angle of 30° becomes 50%, and the wavelength $\lambda$Sh (A2_Ts50%) have a relation of 0 nm<$\lambda$Sh (A2_Tp50%)−$\lambda$Sh (A2_Ts50%)≤20 nm.

3. The optical filter according to claim 1, wherein the absorption layer satisfies the following requirements (i-2) and (i-3),
   (i-2) in a wavelength of 640 to 700 nm, there is a wavelength $\lambda$Sh (DA_T15%) at which a transmittance becomes 15%, and a relation of $\lambda$Sh (DA_T50%)<$\lambda$Sh (DA_T15%)<$\lambda$ (DA_$T_{min}$) is satisfied, and
   (i-3) in a wavelength of 740 to 840 nm, there are a wavelength $\lambda$Lo (DA_T50%) at which a transmittance becomes 50% and a wavelength $\lambda$Lo (DA_T15%) at which a transmittance becomes 15%, and a relation of $\lambda$ (DA_$T_{min}$)<$\lambda$Lo (DA_T15%)<$\lambda$Lo (DA_T50%) is satisfied.

4. The optical filter according to claim 1, wherein the absorption layer contains a near-ultraviolet absorbent having a maximum absorption in a wavelength of 370 to 405 nm, and satisfies the following requirement (i-4), and the reflection layer satisfies the following requirement (ii-3),
   (i-4) in a wavelength of 400 to 420 nm, on a longer wavelength side of a wavelength $\lambda$ (DU_$T_{min}$) exhibiting the maximum absorption, there is a wavelength $\lambda$Lo (DU_T50%) at which a transmittance becomes 50%, and
   (ii-3) in a wavelength of 300 to 420 nm, there is a near-ultraviolet reflection band in which a transmittance with respect to light at an incident angle of 0° becomes 50% or less, and a wavelength $\lambda$Lo (U1_T50%) at which a transmittance becomes 50%, on a longer wavelength side in the near-ultraviolet reflection band, is positioned on a shorter wavelength side of the wavelength $\lambda$Lo (DU_T50%).

5. The optical filter according to claim 4, wherein the absorption layer satisfies the following requirement (i-5), and the reflection layer satisfies the following requirement (ii-4),
   (i-5) on a shorter wavelength side of the wavelength $\lambda$ (DU_$T_{min}$), there is a wavelength $\lambda$Sh (DU_T50%) at which a transmittance becomes 50%, and
   (ii-4) a wavelength $\lambda$Lo (U1_Tp50%) at which a transmittance of light of a p polarization component out of light at an incident angle of 30° becomes 50%, on a longer wavelength side in the near-ultraviolet reflection band, is positioned on a longer wavelength side of the wavelength $\lambda$Sh (DU_T50%).

6. The optical filter according to claim 1, wherein the reflection layer has a first reflection layer having a first near-infrared reflection band in which a transmittance with respect to light at an incident angle of 0° in a first wavelength region within a wavelength of 700 to 1200 nm becomes 50% or less, and a second reflection layer having a second near-infrared reflection band in which a transmittance with respect to light at an incident angle of 0° in a second wavelength region on a shorter wavelength side of the first wavelength region within the wavelength of 700 to 1200 nm becomes 50% or less, and the first near-infrared reflection band and the second near-infrared reflection band form the near-infrared reflection band.

7. The optical filter according to claim 6, wherein the first reflection layer and the second reflection layer are provided by being separated from each other.

8. The optical filter according to claim 6, wherein the wavelength $\lambda$Lo (DA_T15%) is positioned on a longer wavelength side of a wavelength $\lambda$Sh (A2_T15%) at which a transmittance of light at an incident angle of 0° becomes 15%, on a shorter wavelength side in the second near-infrared reflection band.

9. The optical filter according to claim 6, wherein
a wavelength λLo (A1_Tp15%) at which a transmittance of light of a p polarization component out of light at an incident angle of 30° becomes 15%, on a longer wavelength side in the first near-infrared reflection band, is a wavelength longer than a wavelength of 1150 nm.

10. The optical filter according to claim 1, wherein
each of an average value ΔTp ($Avr_{680-750}$) of transmittance differences in the p polarization and an average value ΔTs ($Avr_{680-750}$) of transmittance differences in the s polarization between at the incident angle of 0° and 30°, in a wavelength of 680 to 750 nm, is 1.3% or less.

11. The optical filter according to claim 1, wherein
each of an average value ΔTp ($Avr_{1000-1150}$) of transmittance differences in the p polarization and an average value ΔTs ($Avr_{1000-1150}$) of transmittance differences in the s polarization between at the incident angle of 0° and 30°, in a wavelength of 1000 to 1150 nm, is 10% or less.

12. The optical filter according to claim 1, satisfying at least one of the following requirements (1) to (3),
   (1) in a spectral transmittance curve at an incident angle of 0°, an average transmittance in a wavelength of 440 to 600 nm is 80% or more,
   (2) in the spectral transmittance curve at the incident angle of 0°, an average transmittance in a wavelength of 350 to 400 nm is 5% or less, and
   (3) in the spectral transmittance curve at the incident angle of 0°, an average transmittance in a wavelength of 700 to 1150 nm is 5% or less.

13. The optical filter according to claim 1, wherein
the absorption layer and the reflection layer are provided on one surface or both surfaces of a glass substrate.

14. The optical filter according to claim 13, wherein
the glass substrate is made of a fluorophosphate-based glass or a phosphate-based glass containing Cu.

15. An imaging device, comprising the optical filter according to claim 1.

16. An optical filter, comprising: an absorption layer containing a first near-infrared absorbent having a maximum absorption in a wavelength of 660 to 785 nm, and a second near-infrared absorbent having a maximum absorption in a wavelength of 800 to 920 nm, and satisfying the following requirement (I-1); and a reflection layer formed of a dielectric multilayered film satisfying the following requirement (II-1),
   (I-1) there is a wavelength λSh (DA_T50%) at which a transmittance becomes 50% in a wavelength of 620 to 670 nm, on a shorter wavelength side of a wavelength λ ($DA\_T_{min}$) at which the first near-infrared absorbent exhibits the maximum absorption, there is a wavelength λLo (DB_T50%) at which a transmittance becomes 50% in a wavelength of 900 to 970 nm, on a longer wavelength side of a wavelength λ ($DB\_T_{min}$) at which the second near-infrared absorbent exhibits the maximum absorption, and a relation of λSh (DA_T50%)<λ ($DA\_T_{min}$)<λ ($DB\_T_{min}$)<λLo (DB_T50%) is satisfied, and
   (II-1) in a wavelength of 670 to 1200 nm, there is a near-infrared reflection band in which a transmittance with respect to light at an incident angle of 0° becomes 50% or less, a relation among a wavelength λSh (A1_T50%) at which a transmittance becomes 50% on a shorter wavelength side in the near-infrared reflection band, the wavelength λ ($DB\_T_{min}$), and the wavelength λLo (DB_T50%) is expressed as λ ($DB\_T_{min}$)<λSh (A1_T50%)<λLo (DB_T50%), and a wavelength λLo (A1_Tp15%) at which a transmittance of light of a p polarization component out of light at an incident angle of 30° becomes 15%, on a longer wavelength side in the near-infrared reflection band, is a wavelength longer than a wavelength of 1150 nm.

17. The optical filter according to claim 16, wherein
the absorption layer contains a near-ultraviolet absorbent having a maximum absorption in a wavelength of 370 to 405 nm, and satisfies the following requirement (I-2), and the reflection layer satisfies the following requirement (II-2),
   (I-2) in a wavelength of 400 to 420 nm, on a longer wavelength side of a wavelength λ ($DU\_T_{min}$) exhibiting the maximum absorption, there is a wavelength λLo (DU_T50%) at which a transmittance becomes 50%, and
   (II-2) in a wavelength of 300 to 420 nm, there is a near-ultraviolet reflection band in which a transmittance with respect to light at an incident angle of 0° becomes 50% or less, and a wavelength λLo (U1_T50%) at which a transmittance becomes 50%, on a longer wavelength side of the near-ultraviolet reflection band, is positioned on a shorter wavelength side of the wavelength λLo (DU_T50%).

18. The optical filter according to claim 17, wherein
the absorption layer satisfies the following requirement (I-3), and the reflection layer satisfies the following requirement (II-3),
   (I-3) on a shorter wavelength side of the wavelength λ ($DU\_T_{min}$), there is a wavelength λSh (DU_T50%) at which a transmittance becomes 50%, and
   (II-3) a wavelength λLo (U1_Tp50%) at which a transmittance of light of a p polarization component out of light at an incident angle of 30° becomes 50%, on a longer wavelength side in the near-ultraviolet reflection band, is positioned on a longer wavelength side of the wavelength λSh (DU_T50%).

19. The optical filter according to claim 16, wherein
a wavelength λLo (DB_T15%) at which a transmittance becomes 15%, on a longer wavelength side of the wavelength λ ($DB\_T_{min}$) in the absorption layer, is positioned on a longer wavelength side of a wavelength λSh (A1_T15%) at which a transmittance of light at an incident angle of 0° becomes 15%, on a shorter wavelength side in the near-infrared reflection band in the reflection layer.

20. The optical filter according to claim 16, wherein
each of an average value ΔTp ($Avr_{680-750}$) of transmittance differences in the p polarization and an average value ΔTs ($Avr_{680-750}$) of transmittance differences in the s polarization between at the incident angle of 0° and 30°, in a wavelength of 680 to 750 nm, is 1.3% or less.

21. The optical filter according to claim 16, wherein
each of an average value ΔTp ($Avr_{1000-1150}$) of transmittance differences in the p polarization and an average value ΔTs ($Avr_{1000-1150}$) of transmittance differences in the s polarization between at the incident angle of 0° and 30°, in a wavelength of 1000 to 1150 nm, is 10% or less.

22. The optical filter according to claim 16, satisfying at least one of the following requirements (1) to (3),
   (1) in a spectral transmittance curve at an incident angle of 0°, an average transmittance in a wavelength of 440 to 600 nm is 80% or more, (2) in the spectral transmittance curve at the incident angle of 0°, an average transmittance in a wavelength of 350 to 400 nm is 5% or less, and
(3) in the spectral transmittance curve at the incident angle of 0°, an average transmittance in a wavelength of 700 to 1150 nm is 5% or less.

23. The optical filter according to claim 16, wherein the absorption layer and the reflection layer are provided on one surface or both surfaces of a glass substrate.

24. The optical filter according to claim 23, wherein the glass substrate is made of a fluorophosphate-based glass or a phosphate-based glass containing Cu.

25. An imaging device, comprising the optical filter according to claim 16.

* * * * *